(12) United States Patent
Hsu et al.

(10) Patent No.: US 12,730,533 B2
(45) **Date of Patent: *Sep. 8, 2026**

(54) DRIVING SYSTEM AND DRIVER CIRCUIT FOR CALIBRATION AND SYNCHRONIZATION IN TOUCH SENSING

(71) Applicant: NOVATEK Microelectronics Corp., Hsin-Chu (TW)

(72) Inventors: Chung-Yu Hsu, Hsinchu City (TW); Wan-Ju Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,115

(22) Filed: Dec. 30, 2024

(65) Prior Publication Data

US 2025/0138672 A1 May 1, 2025

Related U.S. Application Data

(63) Continuation-in-part of application No. 18/225,156, filed on Jul. 23, 2023, now Pat. No. 12,223,138.

(51) Int. Cl.
*G06F 3/041* (2006.01)
*G09G 3/20* (2006.01)

(52) U.S. Cl.
CPC ....... *G06F 3/04166* (2019.05); *G09G 3/2092* (2013.01); *G09G 2310/06* (2013.01); *G09G 2310/08* (2013.01); *G09G 2354/00* (2013.01)

(58) Field of Classification Search
CPC .... G06F 3/04166; G06F 3/04184; G06F 3/14; G09G 2310/06; G09G 2310/08; G09G 2320/0693; G09G 2354/00; G09G 3/2092; G09G 5/12
See application file for complete search history.

(56) References Cited

U.S. PATENT DOCUMENTS 5,175,731 A 12/1992 Suarez
5,230,041 A 7/1993 Dinwiddie, Jr.
5,245,322 A 9/1993 Dinwiddie, Jr.
5,434,590 A 7/1995 Dinwiddie, Jr.
(Continued)

FOREIGN PATENT DOCUMENTS

EP 4 246 900 A1 9/2023
TW 201513077 A 4/2015
(Continued)

*Primary Examiner* — Chun-Nan Lin
(74) *Attorney, Agent, or Firm* — Winston Hsu

(57) ABSTRACT

A driving system includes a plurality of driver circuits connected in series, wherein each of the plurality of driver circuits is connected to one or two adjacent driver circuits through a master terminal and a slave terminal. The plurality of driver circuits include a first driver circuit and a second driver circuit. The first driver circuit outputs a first synchronization signal through the master terminal. The second driver circuit outputs a second synchronization signal through the slave terminal when receiving the first synchronization signal through the master terminal. A compensation time corresponding to the second driver circuit is calculated according to an output time point of the first synchronization signal and a reception time point of the second synchronization signal.

9 Claims, 16 Drawing Sheets

(56) References Cited

U.S. PATENT DOCUMENTS

| | | | | |
|---|---|---|---|---|
| 5,434,592 | A | 7/1995 | Dinwiddie, Jr. | |
| 5,526,017 | A | 6/1996 | Wilkie | |
| 9,734,800 | B2 | 8/2017 | Han | |
| 10,546,539 | B2 | 1/2020 | Kim | |
| 11,011,116 | B2 | 5/2021 | An | |
| 2004/0255339 | A1 | 12/2004 | Agnoli | |
| 2007/0120775 | A1 | 5/2007 | Fukumoto | |
| 2007/0216611 | A1 | 9/2007 | Chang | |
| 2014/0081826 | A1 | 3/2014 | Acuna-Rohter | |
| 2015/0091826 | A1 | 4/2015 | Oh | |
| 2015/0123963 | A1 * | 5/2015 | Tsai | G09G 3/2096 345/213 |
| 2018/0019863 | A1 | 1/2018 | Liao | |
| 2019/0189043 | A1 | 6/2019 | Hsu | |
| 2019/0384438 | A1 | 12/2019 | Park | |
| 2021/0089155 | A1 | 3/2021 | Lee | |
| 2022/0179507 | A1 | 6/2022 | Bakken | |
| 2023/0070335 | A1 | 3/2023 | Park | |
| 2023/0134476 | A1 * | 5/2023 | Jung | G09G 3/3696 345/173 |
| 2023/0289009 | A1 | 9/2023 | Lim | |
| 2024/0143104 | A1 | 5/2024 | So | |
| 2024/0211070 | A1 * | 6/2024 | Jung | G06F 3/04166 |
| 2024/0241785 | A1 | 7/2024 | Shih | |

FOREIGN PATENT DOCUMENTS

| | | | |
|---|---|---|---|
| TW | 201624233 | A | 7/2016 |
| TW | 202001504 | A | 1/2020 |
| TW | 202103137 | A | 1/2021 |
| TW | I755177 | B | 2/2022 |
| TW | 202225930 | A | 7/2022 |
| TW | 202309729 | A | 3/2023 |
| TW | 202441490 | A | 10/2024 |

* cited by examiner

DRIVING SYSTEM AND DRIVER CIRCUIT FOR CALIBRATION AND SYNCHRONIZATION IN TOUCH SENSING

CROSS REFERENCE TO RELATED APPLICATIONS

This application continuation-in-part of U.S. application Ser. No. 18/225,156, filed on Jul. 23, 2023. The content of the application is incorporated herein by reference.

BACKGROUND OF THE INVENTION

1. Field of the Invention

The present invention relates to a display system and related driver circuits, and more particularly, to a driving system having multiple driver circuits for cooperatively driving a display panel.

2. Description of the Prior Art

In various electronic products such as mobile phones, GPS navigator systems, monitors, laptops and computers, a touch panel is widely utilized as the interface for data communications. The touch panel is a human-based input device, which complies with requirements for hierarchy menu, and possesses keyboard and mouse functions and human-based operations such as handwriting input as well. Particularly, the touch panel is capable of integrating input and output functions in the same interface, e.g. the screen. This feature is far superior to the conventional input devices.

Due to the trends of increasing size and resolution, a touch panel may be commonly driven by multiple driver circuits (e.g., driver integrated circuits (ICs)). Each driver circuit is responsible to control the touch sensing and display operations of a corresponding area on the touch panel. In the touch sensing operations, a driver circuit outputs a touch driving signal to the corresponding area, where the touch driving signal is usually a sine wave signal. If the touch driving signals of two driver circuits are not synchronized, the received sensing signals may not be well demodulated.

SUMMARY OF THE INVENTION

It is therefore an objective of the present invention to provide a driving system and driver circuits for controlling a display panel, where the driver circuits are capable of performing calibration and synchronization to realize synchronous touch sensing operations.

An embodiment of the present invention discloses a driving system, which comprises a plurality of driver circuits connected in series, wherein each of the plurality of driver circuits is connected to one or two adjacent driver circuits through a master terminal and a slave terminal. The plurality of driver circuits comprise a first driver circuit and a second driver circuit. The first driver circuit outputs a first synchronization signal through the master terminal. The second driver circuit outputs a second synchronization signal through the slave terminal when receiving the first synchronization signal through the master terminal. A compensation time corresponding to the second driver circuit is calculated according to an output time point of the first synchronization signal and a reception time point of the second synchronization signal.

Another embodiment of the present invention discloses a driving system, which comprises a plurality of driver circuits connected in series, wherein each of the plurality of driver circuits is connected to one or two adjacent driver circuits through a master terminal and a slave terminal. The plurality of driver circuits comprise a plurality of slave driver circuits and a master driver circuit. Each of the plurality of slave driver circuits outputs a notification. The master driver circuit receives the notification from the plurality of slave driver circuits; outputs a confirmation signal through the master terminal after receiving the notification from the plurality of slave driver circuits; and starts a sensing operation with a delay of a compensation time for the master driver circuit after outputting the confirmation signal. The plurality of slave driver circuits further receive the confirmation signal through the master terminal, and start the sensing operation with a delay of a compensation time for the respective slave driver circuit after receiving the confirmation signal.

Another embodiment of the present invention discloses a first driver circuit coupled to a plurality of driver circuits in series, wherein the first driver circuit is connected to one or two adjacent driver circuits among the plurality of driver circuits through a master terminal and a slave terminal. The first driver circuit outputs a first synchronization signal through the master terminal; receives a second synchronization signal through the slave terminal, wherein the second synchronization signal is output by a second driver circuit among the plurality of driver circuits when the second driver circuit receives the first synchronization signal; and calculates a compensation time corresponding to the second driver circuit according to an output time point of the first synchronization signal and a reception time point of the second synchronization signal.

Another embodiment of the present invention discloses a master driver circuit coupled to a plurality of slave driver circuits in series, wherein the master driver circuit is connected to one or two adjacent slave driver circuits among the plurality of slave driver circuits through a master terminal and a slave terminal. The master driver circuit receives a notification from the plurality of slave driver circuits; outputs a confirmation signal through the master terminal after receiving the notification from the plurality of slave driver circuits; and starts a sensing operation with a delay of a compensation time for the master driver circuit after outputting the confirmation signal.

Another embodiment of the present invention discloses a slave driver circuit among a plurality of driver circuits connected in series, wherein the slave driver circuit is connected to one or two adjacent driver circuits among the plurality of driver circuits through a master terminal and a slave terminal. The slave driver circuit outputs a notification; receives a confirmation signal from a master driver circuit among the plurality of driver circuits through the master terminal, wherein the confirmation signal is generated in response to the notification; and starts a sensing operation with a delay of a compensation time for the slave driver circuit after receiving the confirmation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
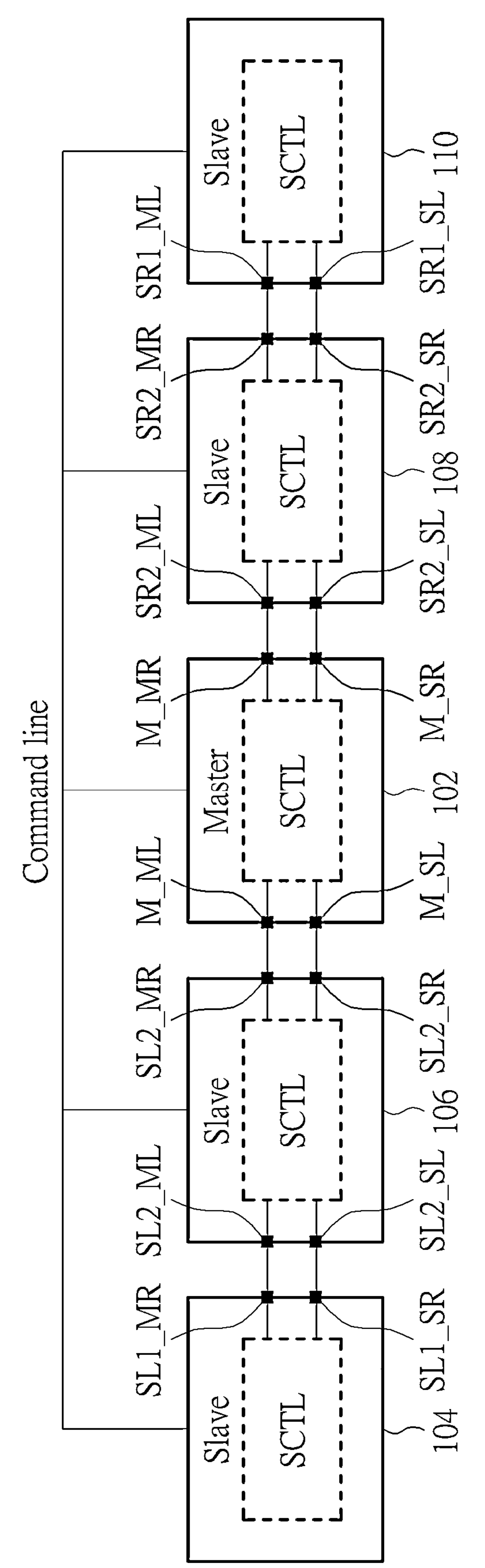
FIG. 1 is a schematic diagram of a driving system according to an embodiment of the present invention.

In a display driving system where a display panel is commonly controlled by multiple driver integrated circuits (ICs), the driver ICs are requested to be synchronized. For example, the display panel may be a touch panel and the driver ICs may be touch and display driver integration (TDDI) ICs, and these TDDI ICS should perform synchronization in the touch sensing operations. In general, the driver ICs may be synchronized in various ways. For example, the synchronization may be performed through a timing controller, or one of the driver ICs may be operated as a master driver IC to provide a synchronization signal to other driver ICs through a command line.

Conventionally, these synchronization schemes do not provide calibration functions, such that the operations of the driver ICs may not be well synchronized due to inconsistent wire loading of different driver ICs. For example, a driver IC closer to the timing controller or the master driver IC that delivers the synchronization signal would have a smaller loading, while a driver IC farther from this timing controller or the master driver IC would have a larger loading. In such a situation, the closer driver IC may receive the synchronization signal earlier, and the farther driver IC may receive the synchronization signal later; hence, these driver ICs may not simultaneously start the touch sensing operations by using the synchronization signal.

U.S. application Ser. No. 18/225,156 provides a driving system for a touch panel, wherein the driver ICs of the driving system are commonly connected through two transmission buses. A calibration operation performed between the driver ICs through the transmission buses. Based on the calibration result indicating the path delay of each driver IC, the synchronization operation may be well performed to make these driver ICs start the touch sensing operations simultaneously.

However, in the driving system described in U.S. application Ser. No. 18/225,156, all driver ICs are commonly connected through two transmission buses, which means that each transmission bus is used to connect a great number of driver ICs, resulting in more complex wire connections and layout implementations on the circuit board. For example, the transmission buses may require many cross wires in the circuit layout. In addition, the input/output (I/O) status of each terminal connected to the transmission bus may be different based on the calibration target. The terminal should be switched to different statuses during the calibration operations, and a leakage current is unavoidable during status transition.

Therefore, the present invention provides a novel structure of a display system, in which the driver circuits are connected in series with two terminals. More specifically, each driver circuit may be connected to one or two adjacent driver circuits through two terminals such as a master terminal and a slave terminal. If the driver circuit is at an end of the series connection, it would be connected to one adjacent driver circuit through two terminals, e.g., one master terminal and one slave terminal. If the driver circuit is connected between two adjacent driver circuits, it would be connected to one of the adjacent driver circuits through a first master terminal and a first slave terminal and connected to another adjacent driver circuit through a second master terminal and a second slave terminal. In this manner, all the driver circuits in the display system may be connected in series.

Since each driver circuit is only connected to its adjacent one or two driver circuits, the cross-wire requirements may be simplified, thereby reducing the circuit costs of the layout. In addition, since the driver circuits of the present invention are not connected through common buses, the I/O status of the connected terminals needs not to be switched during the calibration operations. This reduces the design complexity and also avoids the current leakage problem that may arise due to status transition.

Similarly, the driver circuits connected in series may cooperatively perform calibration and synchronization to start the touch sensing operations simultaneously. In an embodiment, the driver circuits are requested to perform touch sensing with synchronous timing, and should be operated in a synchronization mode to realize the synchronous touch sensing operations. Before the synchronization mode, the path delay between different driver circuits could be calibrated. Note that the transmission time of signals on the wire connections may be different due to the transmission distance, and may also be affected by various environmental issues such as the temperature, loading, and/or noise interferences. Therefore, before the synchronization mode, the driver circuits may be operated in a calibration mode to determine the path delay between different driver circuits. The information of the path delay may be taken to synchronize the touch sensing timing in subsequent synchronization operations. The calibration mode may be performed at any time before the touch sensing operations. In order to be adaptive to the environmental variations, the calibration mode may be performed periodically. In an embodiment, the calibration mode may be performed in an idle time of the driving system, so as to not affect other driving operations.

In various embodiments, the touch sensing operations refer to those operations performed by a driver circuit to obtain the touch data corresponding to the touch gesture applied on the touch panel, which may be associated with finger touch sensing or stylus sensing. As mentioned above, the driver circuits in the driving system may commonly control the touch sensing operations. In an exemplary embodiment, the master driver circuit may output a touch driving signal, and the corresponding touch sensing signal may be received by the driver circuit for controlling this corresponding area, which may be said master driver circuit or another slave driver circuit. Since the touch sensing signal of different areas may be received by different driver circuits, the synchronization operation is requested for the processing of touch sensing signals between these driver circuits, to achieve a satisfactory sensing result.

FIG. 1 is a schematic diagram of a driving system 10 according to an embodiment of the present invention. The driving system 10 includes 5 driver circuits 102, 104, 106, 108 and 110 for commonly controlling a touch panel (not illustrated). Among these driver circuits, the driver circuit 102 is configured as a master driver circuit, and each of the driver circuits 104, 106, 108 and 110 is configured as a slave driver circuit. Each of the driver circuits 102-110 is responsible to control a corresponding area on the touch panel. In general, in a driving system commonly controlling a touch panel, there may be one master driver circuit, and the other driver circuits are slave driver circuits. In an exemplary embodiment, the driver circuit that starts the transmission of a confirmation signal for synchronization is determined to be a master driver circuit, and other driver circuits are determined to be slave driver circuits.

In various embodiments of the present invention, each of the driver circuits may be an IC implemented in a chip. Therefore, the driver circuit is abbreviated as driver IC, the master driver circuit is abbreviated as master IC, and the slave driver circuit is abbreviated as slave IC hereinafter.

As shown in FIG. 1, the driver ICs 102-110 are connected in series, where the master IC 102 is deployed at the center, with 2 slave ICs 104 and 106 connected at the left side of the master IC 102 and 2 slave ICs 108 and 110 connected at the right side of the master IC 102. Note that the left side and right side described herein only refer to different sides/directions of the wire connections in series, but will not limit the places where the driver ICs are deployed.

Each driver IC 102-110 is connected to the adjacent driver IC(s) through two terminals, which may be referred to as a master terminal and a slave terminal. Each of the terminals may be an I/O pin of the IC. In detail, the slave IC 104 is connected to the slave IC 106 through a master terminal SL1_MR and a slave terminal SL1_SR. The slave IC 106 is connected to the slave IC 104 through a master terminal SL2_ML and a slave terminal SL2_SL, and also connected to the master IC 102 through a master terminal SL2_MR and a slave terminal SL2_SR. The master IC 102 is connected to the slave IC 106 through a master terminal M_ML and a slave terminal M_SL, and also connected to the slave IC 108 through a master terminal M_MR and a slave terminal M_SR. The slave IC 108 is connected to the master IC 102 through a master terminal SR2_ML and a slave terminal SR2_SL, and also connected to the slave IC 110 through a master terminal SR2_MR and a slave terminal SR2_SR. The slave IC 110 is connected to the slave IC 108 through a master terminal SR1_ML and a slave terminal SR1_SL. With the master terminal and slave terminal connected between every two adjacent driver ICs, all of the driver ICs 102-110 included in the driving system 10 could be connected in series.

In this embodiment, a command line may also be coupled to each driver IC 102-110 for communications between these driver ICs 102-110. The command line may be implemented by using any type of interface, such as the serial peripheral interface (SPI). In another embodiment, the command line may be omitted. Each of the master IC 102 and the slave ICs 104-110 may include a synchronization controller SCTL, for performing the calibration and synchronization operations in each driver IC.

With the connections of the driving system 10, a closed loop may be formed between every two driver circuits through the wire connections between the master terminals and the slave terminals of these two driver circuits and the driver circuit(s) therebetween (if any). For example, a closed loop may be formed between the master IC 102 and any of the slave ICs 104-110. Taking the master IC 102 and the slave IC 104 as an example, the closed loop may start from the master terminal M_ML, through the master terminals SL2_MR, SL2_ML and SL1_MR and the slave terminals SL1_SR, SL2_SL and SL2_SR, to the slave terminal M_SL. In such a situation, the path delay between any two driver circuits may be obtained.

Figure 2A:
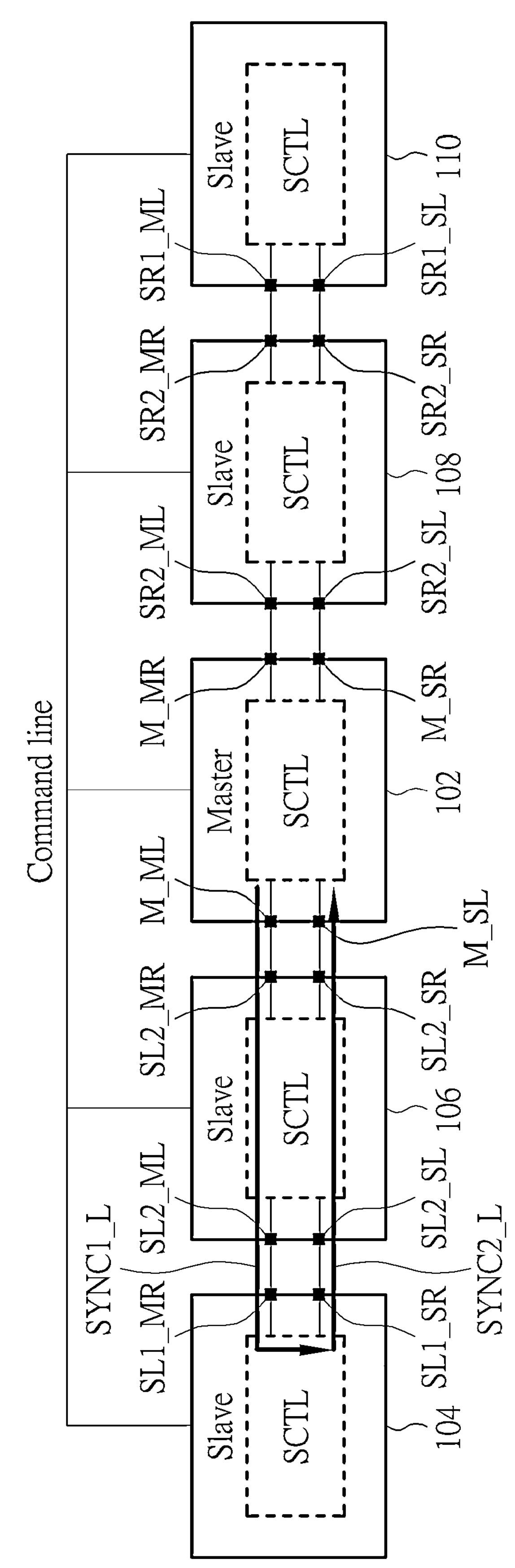
FIG. 2A and FIG. 2B illustrate exemplary operations of the driving system in the calibration mode.
Figure 2B:
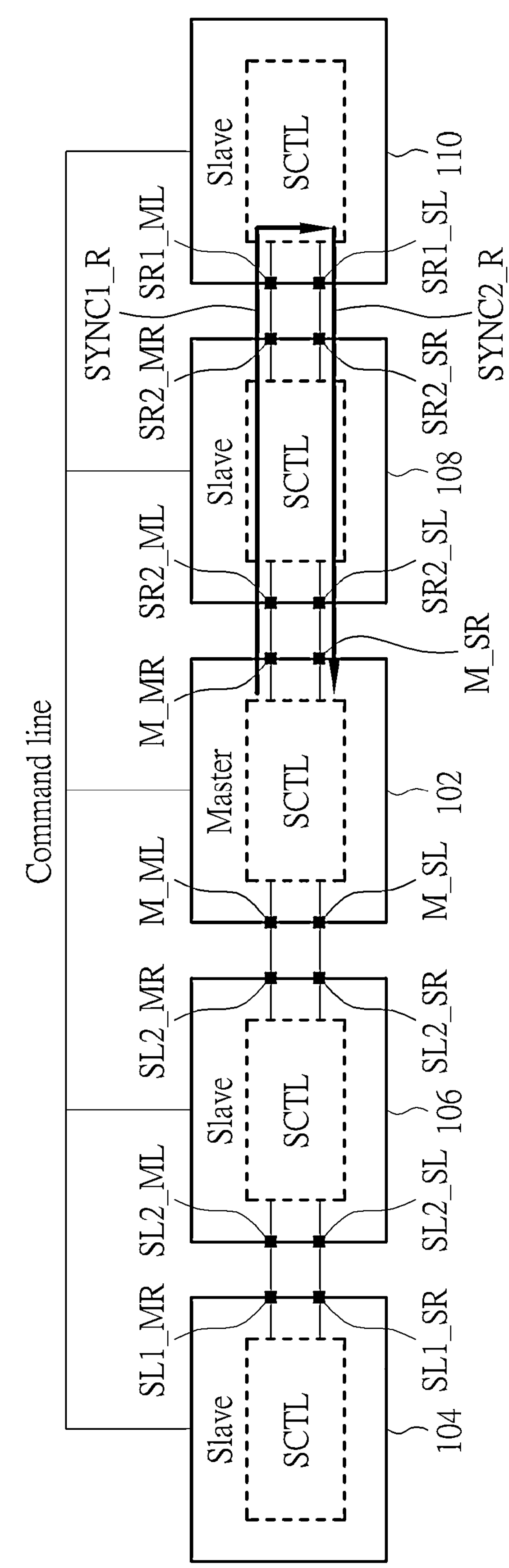

FIGS. 2A and 2B illustrate exemplary operations of the driving system 10 in the calibration mode. FIG. 2A illustrates that the master IC 102 calibrates the path toward the slave ICs 104 and 106 at the left side. In this embodiment, the master IC 102 may be taken as the start point of signal transmission for measuring the path delays corresponding to the left-side slave ICs 104 and 106. In detail, the master IC 102 may first output a first left synchronization signal SYNC1_L to the slave IC 106 through the master terminal M_ML, and meanwhile start a timer. The slave IC 106 then receives the first left synchronization signal SYNC1_L through the master terminal SL2_MR, and forwards the first left synchronization signal SYNC1_L to the slave IC 104 through the master terminal SL2_ML. At the time when the left-most slave receives the first left synchronization signal SYNC1_L through the master terminal SL1_MR, this slave IC 104 may output a second left synchronization signal SYNC2_L to the slave IC 106 through the slave terminal SL1_SR. The slave IC 106 then receives the second left synchronization signal SYNC2_L through the slave terminal SL2_SL, and forwards the second left synchronization signal SYNC2_L to the master IC 102 through the slave terminal SL2_SR. When receiving the second left synchronization signal SYNC2_L, the master IC 102 may stop the timer.

In this manner, the master IC 102 may obtain the path delay between the master IC 102 and the slave IC 104 according to the timer result, which records a time difference between the output time point of the first left synchronization signal SYNC1_L output by the master IC 102 and the reception time point of the second left synchronization signal SYNC2_L received by the master IC 102. Subsequently, the master IC 102 may calculate and obtain the compensation time corresponding to the slave IC 104 according to the path delay.

In an embodiment, the value of the path delay may be divided by 2 to obtain the compensation time for the slave IC 104, to be used in the synchronization mode to synchronize the sensing time of the master IC 102 and the slave IC 104. In an embodiment, the compensation time may further be manually adjusted or tuned to achieve an optimal synchronization result.

The first left synchronization signal SYNC1_L and the second left synchronization signal SYNC2_L may also be applied to calibrate the slave IC 106. In detail, when the slave IC 106 receives the first left synchronization signal SYNC1_L from the master IC 102 through the master terminal SL2_MR (or the slave IC 106 outputs the first left synchronization signal SYNC1_L through the master terminal SL2_ML), it may start a timer. Afterwards, when the slave IC 106 receives the second left synchronization signal SYNC2_L from the slave IC 104 through the slave terminal SL2_SL (or the slave IC 106 outputs the second left synchronization signal SYNC2_L through the slave terminal SL2_SR), it may stop the timer. Therefore, the timer of the slave IC 106 will record a time difference between the reception time point of the first left synchronization signal SYNC1_L received by the slave IC 106 and the reception time point of the second left synchronization signal SYNC2_L received by the slave IC 106, and this is equivalent to the path delay between the slave ICs 104 and 106.

Subsequently, the slave IC 106 may send the recorded timer information to the master IC 102, e.g., through the command line. The master IC 102 may obtain the path delay between the slave ICs 104 and 106 based on the information received from the slave IC 106. Alternatively or additionally, the slave IC 106 may store the recorded timer information to be used in itself in the subsequent synchronization mode.

As a result, the master IC 102 may obtain the compensation times for the slave ICs 104 and 106 connected at the left side of the master IC 102 by outputting a synchronization signal through the left-side master terminal M_ML and receiving a synchronization signal through the left-side slave terminal M_SL. The master IC 102 may calculate the compensation time for the slave IC 104 and/or the compensation time for the slave IC 106 based on the path delay information obtained in the calibration mode.

Similarly, another transmission scheme is performed to calibrate the slave ICs 108 and 110 connected at the right side of the master IC 102, as shown in FIG. 2B. The master IC 102 may first output a first right synchronization signal SYNC1_R to the slave IC 108 through the master terminal M_MR, and meanwhile start a timer. The slave IC 108 then receives the first right synchronization signal SYNC1_R through the master terminal SR2_ML, and forwards the first right synchronization signal SYNC1_R to the slave IC 110 through the master terminal SR2_MR. At the time when the right-most slave IC 110 receives the first right synchronization signal SYNC1_R through the master terminal SR1_ML, this slave IC 110 may output a second right synchronization signal SYNC2_R to the slave IC 108 through the slave terminal SR1_SL. The slave IC 108 then receives the second right synchronization signal SYNC2_R through the slave terminal SR2_SR, and forwards the second right synchronization signal SYNC2_R to the master IC 102 through the slave terminal SR2_SL. When receiving the second right synchronization signal SYNC2_R, the master IC 102 may stop the timer.

In this manner, the master IC 102 may obtain the path delay between the master IC 102 and the slave IC 110 according to the timer result, which records a time difference between the output time point of the first right synchronization signal SYNC1_R output by the master IC 102 and the reception time point of the second right synchronization signal SYNC2_R received by the master IC 102. Subsequently, the master IC 102 may calculate and obtain the compensation time corresponding to the slave IC 110 according to the path delay.

In an embodiment, the value of the path delay may be divided by 2 to obtain the compensation time for the slave IC 110, to be used in the synchronization mode to synchronize the sensing time of the master IC 102 and the slave IC 110. In an embodiment, the compensation time may further be manually adjusted or tuned to achieve an optimal synchronization result.

The first right synchronization signal SYNC1_R and the second right synchronization signal SYNC2_R may also be applied to calibrate the slave IC 108. In detail, when the slave IC 108 receives the first right synchronization signal SYNC1_R from the master IC 102 through the master terminal SR2_ML (or the slave IC 108 outputs the first right synchronization signal SYNC1_R through the master terminal SR2_MR), it may start a timer. Afterwards, when the slave IC 108 receives the second right synchronization signal SYNC2_R from the slave IC 110 through the slave terminal SR2_SR (or the slave IC 108 outputs the second right synchronization signal SYNC2_R through the slave terminal SR2_SL), it may stop the timer. Therefore, the timer of the slave IC 108 will record a time difference between the reception time point of the first right synchronization signal SYNC1_R received by the slave IC 108 and the reception time point of the second right synchronization signal SYNC2_R received by the slave IC 108, and this is equivalent to the path delay between the slave ICs 108 and 110.

Subsequently, the slave IC 108 may send the recorded timer information to the master IC 102, e.g., through the command line. The master IC 102 may obtain the path delay between the slave ICs 108 and 110 based on the information received from the slave IC 108. Alternatively or additionally, the slave IC 108 may store the recorded timer information to be used in itself in the subsequent synchronization mode.

As a result, the master IC 102 may obtain the compensation times for the slave ICs 108 and 110 connected at the right side of the master IC 102 by outputting a synchronization signal through the right-side master terminal M_MR and receiving a synchronization signal through the right-side slave terminal M_SR. The master IC 102 may calculate the compensation time for the slave IC 108 and/or the compensation time for the slave IC 110 based on the path delay information obtained in the calibration mode.

Figure 3:
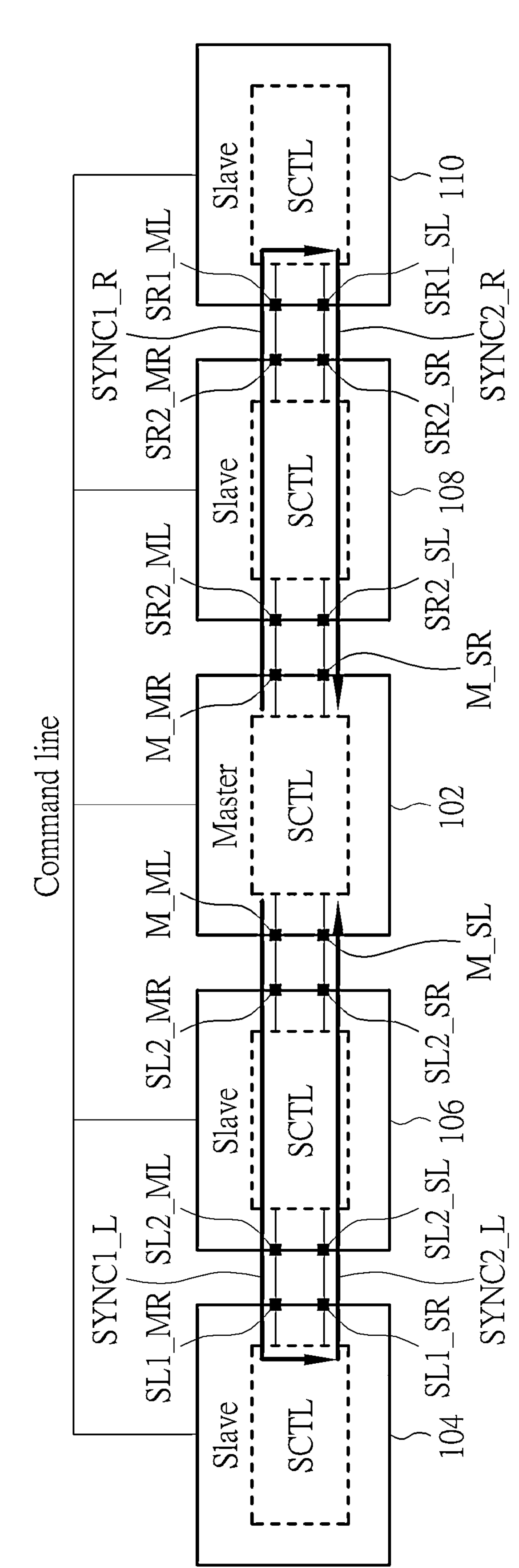
FIG. 3 illustrates that the master IC outputs the first left synchronization signal and the first right synchronization signal simultaneously.

As can be seen, the path delays of multiple driver ICs may be obtained in one calibration operation. In an embodiment, in the calibration mode, the master IC 102 may output the first left synchronization signal SYNC1_L and the first right synchronization signal SYNC1_R simultaneously, as shown in FIG. 3. Note that in the driving system of U.S. application Ser. No. 18/225,156, the calibration of the left-side driver ICs and the calibration of the right-side driver ICs should be performed at different time because the calibration operations of two sides use the same transmission buses for forwarding the synchronization signals. In comparison, in the present invention, since the left-side driver ICs and the right-side driver ICs are coupled to the master IC through different wire connection paths, the calibration operations of two sides may be performed simultaneously.

As shown in FIG. 3, the master IC 102 may output the first left synchronization signal SYNC1_L and the first right synchronization signal SYNC1_R simultaneously, in order to save the time consumption of the calibration operations. The master IC 102 may also monitor the left-side slave terminal M_SL and the right-side slave terminal M_SR simultaneously, to determine the reception time points of the second left synchronization signal SYNC2_L and the second right synchronization signal SYNC2_R.

In several embodiments, the master IC 102 may receive the second left synchronization signal SYNC2_L and the second right synchronization signal SYNC2_R at different time points even when the first left synchronization signal SYNC1_L and the first right synchronization signal SYNC1_R are output at the same time. This means that the obtained path delay of the left-side slave IC 104 and path delay of the right-side slave IC 110 may be different. The timing difference may be considered as an offset to be incorporated in the synchronization mode. The offset may be applied to compensate for the time difference between the left-side driver ICs and the right-side driver ICs, to make the touch sensing operations between the two sides to be well synchronous.

Figure 4:
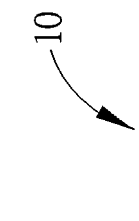
FIG. 4 illustrates the calibration operation for obtaining path delays in the driving system according to an embodiment of the present invention.
Figure 4:
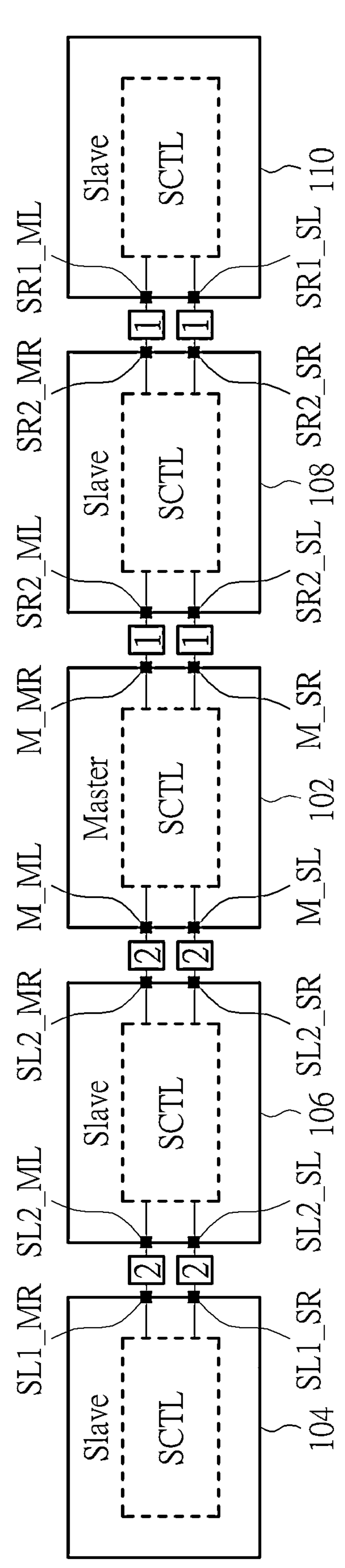
Figure 5:
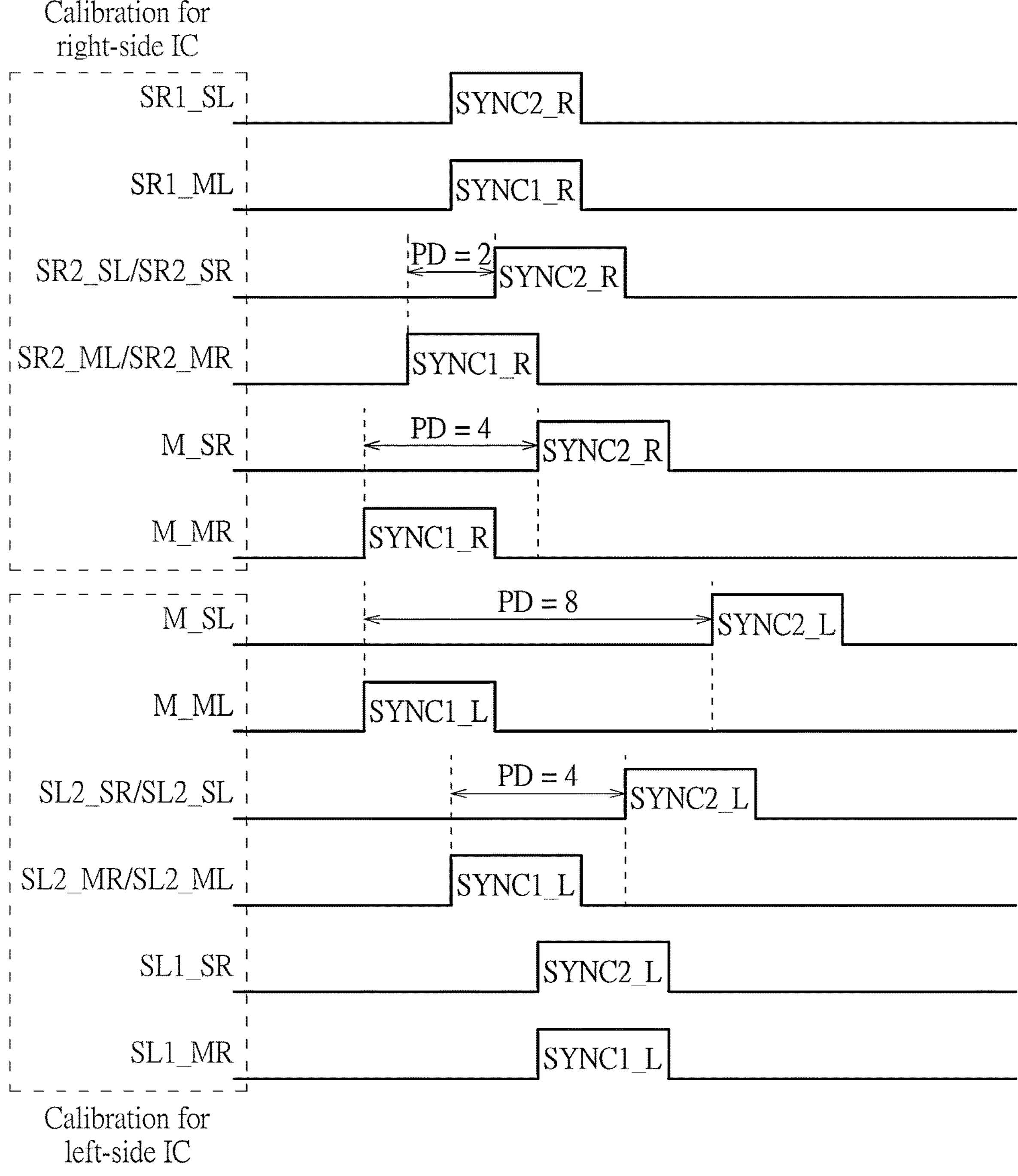
FIG. 5 is a waveform diagram of the synchronization signals on each terminal under the delay times specified in FIG. 4.

FIG. 4 illustrates the calibration operation for obtaining path delays in the driving system 10 according to an embodiment of the present invention, where the values of delay times are correspondingly labeled on the paths of the connected wires. FIG. 5 is a waveform diagram of the synchronization signals on each terminal under the delay times specified in FIG. 4. In FIG. 5, the synchronization signals SYNC1_L, SYNC1_R, SYNC2_L and SYNC2_R are pulse signals, but those skilled in the art would know that the implementation is not limited thereto.

As shown in FIG. 4, the driver ICs from 104 to 110 are connected in series with the same or different path delays, where every two adjacent driver ICs are connected to each other through two wires corresponding to the master terminal and the slave terminal, respectively. In detail, the slave ICs 104 and 106 are connected to each other through two wires, which have a delay time equal to 2. The slave IC 106 and the master IC 102 are connected to each other through two wires, which have a delay time equal to 2. The master IC 102 and the slave IC 108 are connected to each other through two wires, which have a delay time equal to 1. The slave ICs 108 and 110 are connected to each other through two wires, which have a delay time equal to 1.

As shown in FIG. 5, the master IC 102 first outputs the first left synchronization signal SYNC1_L through the master terminal M_ML and outputs the first right synchronization signal SYNC1_R through the master terminal M_MR, and starts a first timer and a second timer, where the first timer may be used for the calibration of the left-side slave ICs 104 and 106 and the second timer may be used for the calibration of the right-side slave ICs 108 and 110. The first left synchronization signal SYNC1_L is forwarded leftwards and reaches the master terminal SL2_MR of the slave IC 106 after a delay time 2. At this moment, the slave IC 106 starts a timer in response to the reception of the first left synchronization signal SYNC1_L. The slave IC 106 further forwards the first left synchronization signal SYNC1_L to the slave IC 104 through the master terminal SL2_ML. The first left synchronization signal SYNC1_L is forwarded leftwards and then reaches the master terminal SL1_MR of the slave IC 104 after another delay time 2. The slave IC 104 sends back the second left synchronization signal SYNC2_L through the slave terminal SL1_SR when receiving the first left synchronization signal SYNC1_L. The second left synchronization signal SYNC2_L is forwarded rightwards and reaches the slave terminal SL2_SL of the slave IC 106 after a delay time 2. At this moment, the slave IC 106 stops the timer in response to the reception of the second left synchronization signal SYNC2_L. The timer of the slave IC 106 will record the path delay (denoted by PD) between the slave ICs 104 and 106, which is equal to 4.

The second left synchronization signal SYNC2_L is further forwarded rightwards and then reaches the slave terminal M_SL of the master IC 102 after another delay time 2. At this moment, the master IC 102 stops the first timer in response to the reception of the second left synchronization signal SYNC2_L. The first timer of the master IC 102 will record the path delay between the master IC 102 and the left-most slave IC 104, which is equal to 8.

In a similar manner, the first right synchronization signal SYNC1_R output by the master IC 102 is forwarded rightwards and reaches the master terminal SR2_ML of the slave IC 108 after a delay time 1. At this moment, the slave IC 108 starts a timer in response to the reception of the first right synchronization signal SYNC1_R. The slave IC 108 further forwards the first right synchronization signal SYNC1_R to the slave IC 110 through the master terminal SR2_MR. The first right synchronization signal SYNC1_R is forwarded rightwards and then reaches the master terminal SR1_ML of the slave IC 110 after another delay time 1. The slave IC 110 sends back the second right synchronization signal SYNC2_R through the slave terminal SR1_SL when receiving the first right synchronization signal SYNC1_R. The second right synchronization signal SYNC2_R is forwarded leftwards and reaches the slave terminal SR2_SR of the slave IC 108 after a delay time 1. At this moment, the slave IC 108 stops the timer in response to the reception of the second right synchronization signal SYNC2_R. The timer of the slave IC 108 will record the path delay between the slave ICs 108 and 110, which is equal to 2.

The second right synchronization signal SYNC2_R is further forwarded leftwards and then reaches the slave terminal M_SR of the master IC 102 after another delay time 1. At this moment, the master IC 102 stops the second timer in response to the reception of the second right synchronization signal SYNC2_R. The second timer of the master IC 102 will record the path delay between the master IC 102 and the right-most slave IC 110, which is equal to 4.

As mentioned above, the value of the path delay may be divided by 2 to obtain the compensation time for the corresponding slave IC. Based on the value of the timers, the compensation time required between the slave ICs 104 and 106 is calculated as 4/2=2, the compensation time required between the slave IC 104 and the master IC 102 is calculated as 8/2=4, the compensation time required between the slave ICs 108 and 110 is calculated as 4/2=2, and the compensation time required between the master IC 102 and the slave IC 108 is calculated as 2/2=1. Therefore, the corresponding driver ICs may take the compensation time information to be used in the subsequent synchronization mode.

In this embodiment, since the path delays for the left-side slave ICs 104 and 106 are not symmetric to the path delays for the right-side slave ICs 108 and 110, an offset may further be used to modify or adjust the compensation times, in order to synchronize the slave ICs 104-110 at both sides.

In detail, as shown in FIG. 5, the maximum path delay at the left side (i.e., the path delay between the master IC 102 and the left-most slave IC 104) is equal to 8, and the maximum path delay at the right side (i.e., the path delay between the master IC 102 and the right-most slave IC 110) is equal to 4. These two path delays are not equal, and thus it is requested to apply an additional offset to compensate for their difference. As mentioned above, the compensation time is obtained by dividing the path delay by 2. Similarly, the offset may be calculated by dividing the path delay difference by 2. In this embodiment, the path delay difference between the left side and the right side equals 4, which may be divided by 2 to obtain an offset equal to 2, where the offset is added to those slave ICs at the side having a smaller path delay. Therefore, an offset 2 may be added to the compensation times for the right-side slave ICs 108 and 110, in order to achieve the synchronization between the slave ICs 108 and 110 at the right side and the slave ICs 104 and 106 at the left side.

Figure 6:
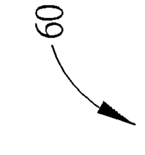
FIG. 6 is a schematic diagram of another driving system according to an embodiment of the present invention.
Figure 6:
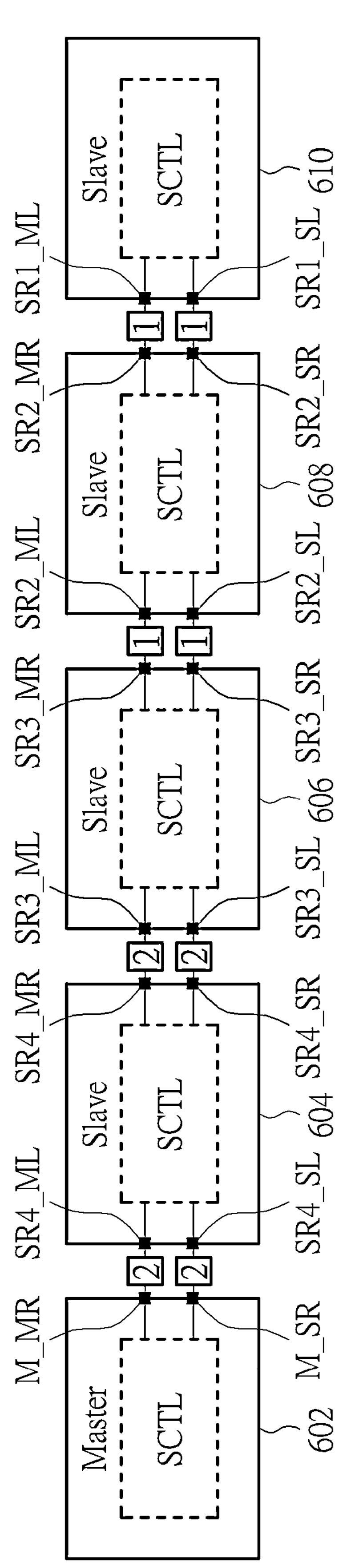

Note that the driver ICs in the driving system may be deployed in another manner. For example, it is not necessary that the master IC is at the center of the driving system. For example, FIG. 6 is a schematic diagram of another driving system 60, which includes 1 master IC 602 and 4 slave ICs 604, 606, 608 and 610. These driver ICs 602-610 are connected in series, where the master IC 602 is the left-most driver IC and the slave ICs 604-610 are all connected at the right side of the master IC 602. Similarly, each of the driver ICs 602-610 may include a synchronization controller SCTL for performing the calibration and synchronization operations.

Similarly, in the driving system 60, every two adjacent driver ICs are connected with two wires, through a master terminal and a slave terminal, respectively. In detail, the master IC 602 includes one master terminal M_MR and one slave terminal M_SR, which are respectively connected to a master terminal SR4_ML and a slave terminal SR4_SL of the slave IC 604. Another master terminal SR4_MR and another slave terminal SR4_SR of the slave IC 604 are respectively connected to a master terminal SR3_ML and a slave terminal SR3_SL of the slave IC 606. Another master terminal SR3_MR and another slave terminal SR3_SR of the slave IC 606 are respectively connected to a master terminal SR2_ML and a slave terminal SR2_SL of the slave IC 608. Another master terminal SR2_MR and another slave terminal SR2_SR of the slave IC 608 are respectively connected to a master terminal SR1_ML and a slave terminal SR1_SL of the slave IC 610.

The information of the delay times is also shown in FIG. 6. In this embodiment, the delay time between the master IC 602 and the slave IC 604 equals 2, the delay time between the slave ICs 604 and 606 equals 2, the delay time between the slave ICs 606 and 608 equals 1, and the delay time between the slave ICs 608 and 610 equals 1.

In the calibration mode, the transmission of synchronization signals may be started from the master IC 602, but the present invention is not limited thereto. In another embodiment, the transmission of synchronization signals may be started from any of the slave ICs 604-610.

The master IC 602 may output a first synchronization signal SYNC1 through the master terminal M_MR and start a timer. The first synchronization signal SYNC1 is forwarded rightwards and reaches the master terminal SR4_ML of the slave IC 604, the master terminal SR3_ML of the slave IC 606, the master terminal SR2_ML of the slave IC 608, and the master terminal SR1_ML of the slave IC 610 sequentially. At the time when the slave IC 610 receives the first synchronization signal SYNC1, it may output a second synchronization signal SYNC2 through the slave terminal SR1_SL. The second synchronization signal SYNC2 is forwarded leftwards and reaches the slave terminal SR2_SR of the slave IC 608, the slave terminal SR3_SR of the slave IC 606, the slave terminal SR4_SR of the slave IC 604, and the slave terminal M_SR of the master IC 602 sequentially. The master IC 602 may stop the timer when receiving the second synchronization signal SYNC2.

Figure 7:
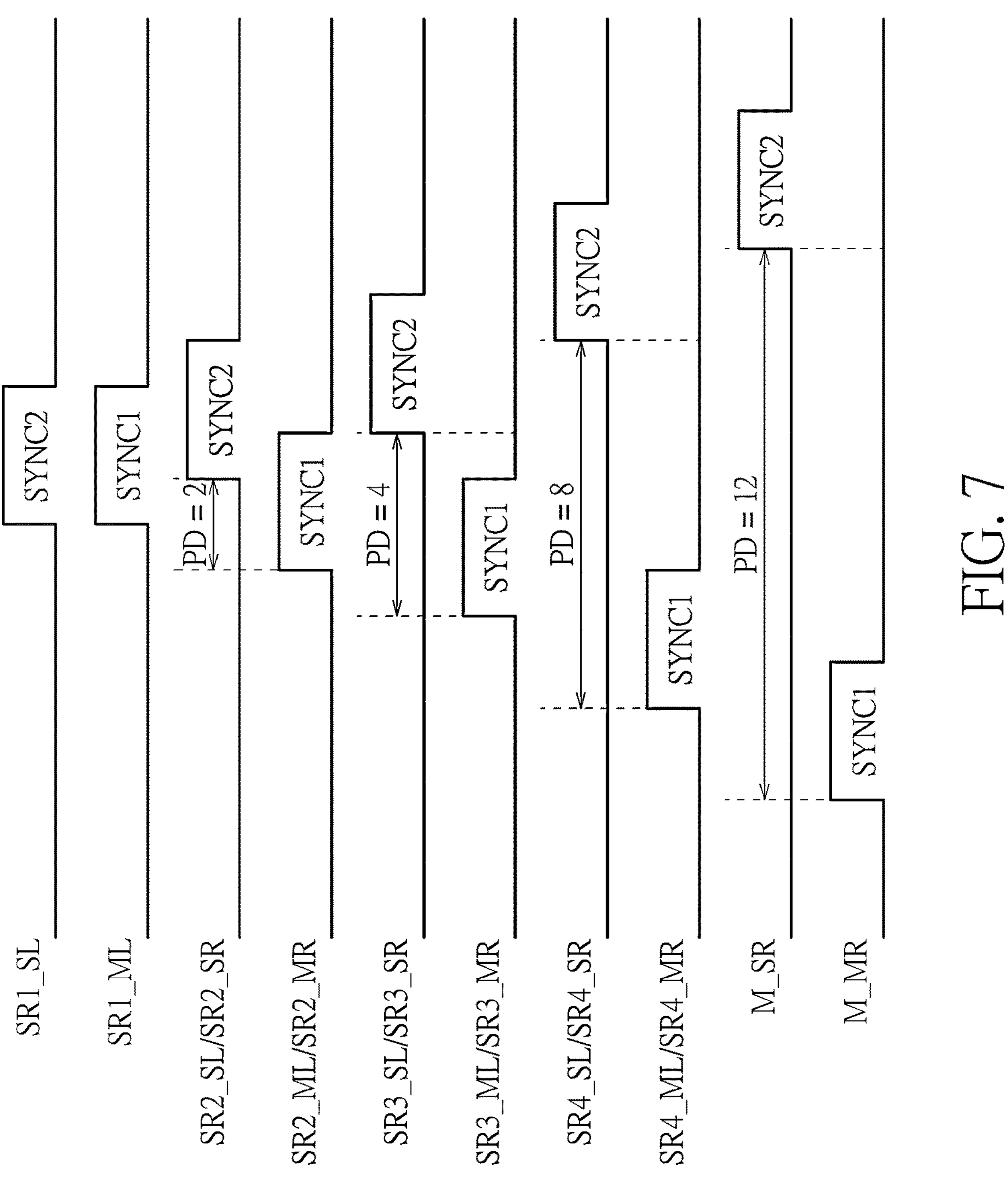
FIG. 7 is a waveform diagram of the synchronization signals on each terminal of the driving system shown in FIG. 6.

In this manner, the master IC 602 may obtain the path delay between the master IC 602 and the slave IC 610, which is equal to 12 (i.e., PD=12), as shown in FIG. 7. The master IC 602 may further calculate the compensation time for the slave IC 610 according to the path delay, where the compensation time may be 12/2=6. Similarly, the slave ICs 604, 606 and 608 may also use a timer to record the difference of the reception time point of the first synchronization signal SYNC1 and the reception time point of the second synchronization signal SYNC2, thereby obtaining the corresponding path delay. As shown in FIG. 7, the slave IC 604 may obtain the path delay between the slave ICs 604 and 610, which is equal to 8. The slave IC 606 may obtain the path delay between the slave ICs 606 and 610, which is equal to 4. The slave IC 608 may obtain the path delay between the slave ICs 608 and 610, which is equal to 2. Based on the above path delay information, the compensation time between any two driver ICs may be easily obtained.

In an embodiment, the master IC 602 may collect the path delay information from the slave ICs 604, 606 and 608, e.g., through the command line, to calculate the compensation time used for the master IC 602 and each slave IC 604-610 accordingly. The detailed calculations are similar to those illustrated in the above paragraphs, and will not be narrated herein.

Figure 8:
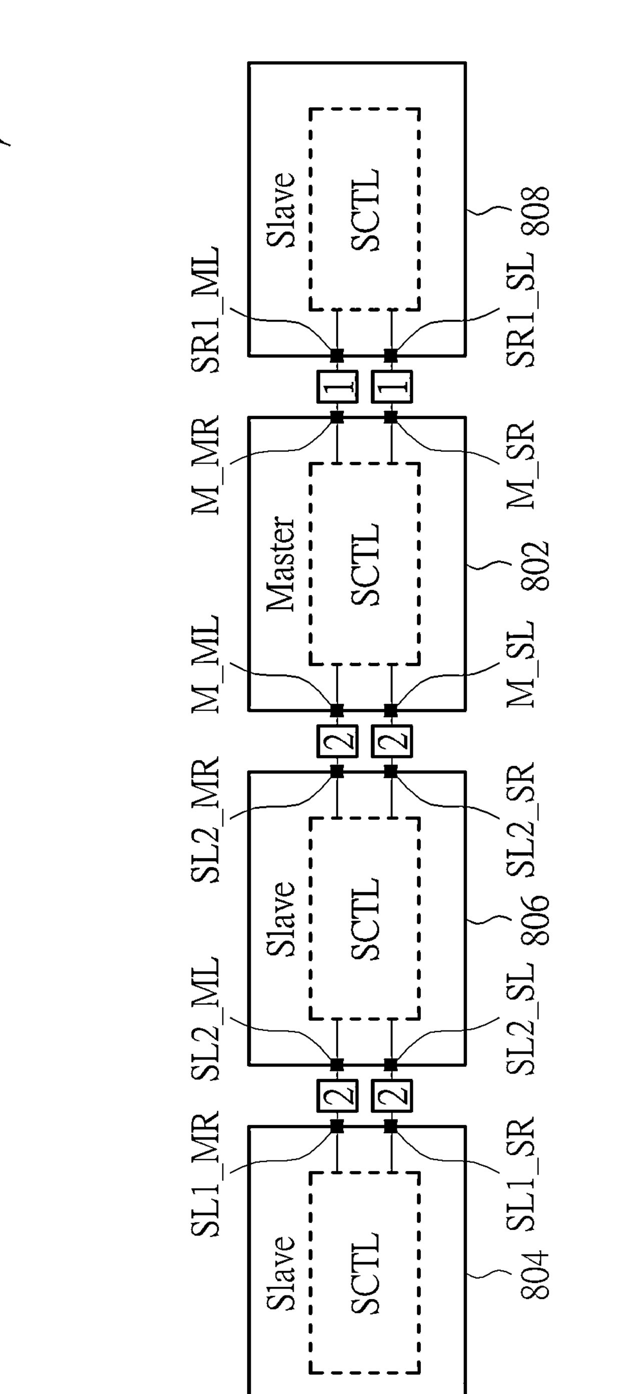
FIG. 8 is a schematic diagram of another driving system according to an embodiment of the present invention.

In the above embodiments, the driving system includes 5 driver ICs, and the master IC and slave ICs are deployed symmetrically to perform the calibration operations. In another embodiment, there may be any number of driver ICs in a driving system, and the master IC may be at any position. For example, FIG. 8 is a schematic diagram of another driving system 80, which includes 1 master IC 802 and 3 slave ICs 804, 806 and 808. These driver ICs 802-808 are connected in series, where 2 slave ICs 804 and 806 are connected at the left side of the master IC 802 and 1 slave IC 808 is connected at the right side of the master IC 802.

Similarly, in the driving system 80, every two adjacent driver ICs are connected with two wires, through a master terminal and a slave terminal, respectively. In detail, a master terminal SL1_MR and a slave terminal SL1_SR of the slave IC 804 are respectively connected to a master terminal SL2_ML and a slave terminal SL2_SL of the slave IC 806. Another master terminal SL2_MR and another slave terminal SL2_SR of the slave IC 806 are respectively connected to a master terminal M_ML and a slave terminal M_SL of the master IC 802. Another master terminal M_MR and another slave terminal M_SR of the master IC 802 are respectively connected to a master terminal SR1_ML and a slave terminal SR1_SL of the slave IC 808.

The information of the delay time is also shown in FIG. 8. In this embodiment, the delay time between the slave ICs 804 and 806 equals 2, the delay time between the slave IC 806 and the master IC 802 equals 2, and the delay time between the master IC 802 and the slave IC 808 equals 1.

In this embodiment, in the calibration mode, the transmission of synchronization signals may be started from the master IC 802, which calibrates the path toward the left-side slave ICs 804 and 806 and the path toward the right-side slave IC 808 by using different synchronization signals. In detail, the master IC 802 may output a first left synchronization signal SYNC1_L through the master terminal M_ML and output a first right synchronization signal SYNC1_R through the master terminal M_MR, and start a first timer and a second timer, where the first timer may be used for the calibration of the left-side slave ICs 804 and 806 and the second timer may be used for the calibration of the right-side slave IC 808. The first left synchronization signal SYNC1_L may be forwarded leftwards and reach the master terminal SL2_MR of the slave IC 806 and the master terminal SL1_MR of the slave IC 804 sequentially. At the time when the slave IC 804 receives the first left synchronization signal SYNC1_L, it may output a second left synchronization signal SYNC2_L through the slave terminal SL1_SR. The second left synchronization signal SYNC2_L is forwarded rightwards and reaches the slave terminal SL2_SL of the slave IC 806 and the slave terminal M_SL of the master IC 802 sequentially. The master IC 802 may stop the first timer when receiving the second left synchronization signal SYNC2_L.

Similarly, the slave IC 806 may also use a timer to record the difference of the reception time point of the first left synchronization signal SYNC1_L and the reception time point of the second left synchronization signal SYNC2_L, thereby obtaining the corresponding path delay between the slave ICs 804 and 806.

The first right synchronization signal SYNC1_R output by the master IC 802 may be forwarded rightwards and reach the master terminal SR1_ML of the slave IC 808. At the time when the slave IC 808 receives the first right synchronization signal SYNC1_R, it may output a second right synchronization signal SYNC2_R through the slave terminal SR1_SL. The second right synchronization signal SYNC2_R is forwarded leftwards and reaches the slave terminal M_SR of the master IC 802. The master IC 802 may stop the second timer when receiving the second right synchronization signal SYNC2_R.

Figure 9:
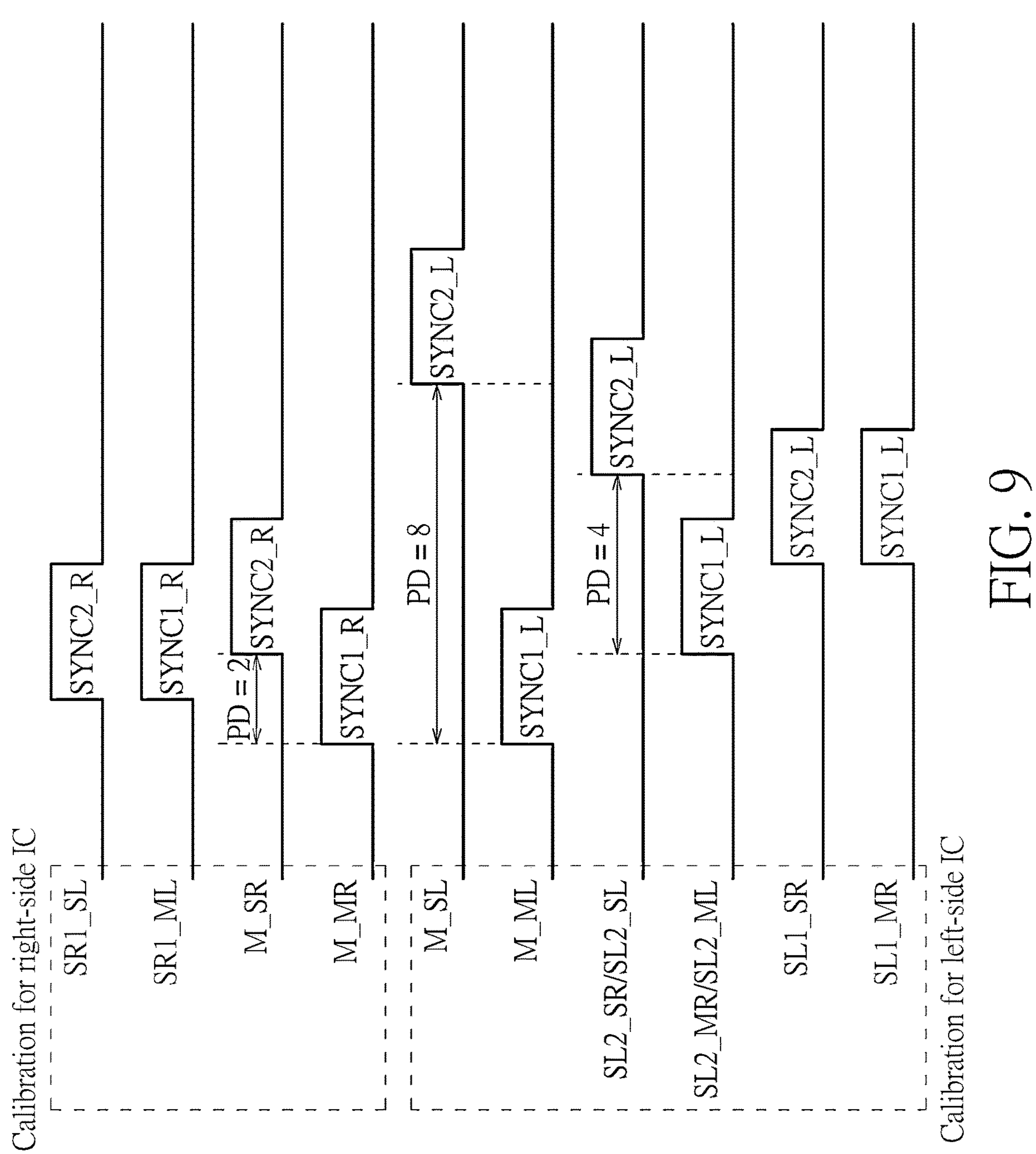
FIG. 9 is a waveform diagram of the synchronization signals on each terminal of the driving system shown in FIG. 8.

Based on the operations of sending the synchronization signals and controlling the timers as described above, the master IC 802 may obtain and/or calculate the path delays between every two driver ICs, and the corresponding compensation times may be calculated accordingly. The waveforms of the synchronization signals SYNC1_L, SYNC1_R, SYNC2_L and SYNC2_R on each terminal are shown in FIG. 9. FIG. 9 also shows the obtained path delays (denoted by PD) under the delay times specified in FIG. 8. The detailed descriptions of obtaining the path delays and calculating the compensation times are similar to those described above, and will be omitted herein.

The obtained compensation time for each driver IC in the calibration mode may further be applied in the synchronization mode, to synchronize the sensing time for touch sensing between different driver ICs, as described below.

In the synchronization operation, each driver IC may determine whether the touch sensing operation is performable based on a display part (DP) ready signal. The DP ready signal may be a signal that the display circuit (i.e., display part) of the driver IC outputs to the touch circuit (i.e., touch part) of the driver IC, to indicate whether the display operation is currently in progress. In general, in a TDDI IC, the display operations and touch sensing operations should be performed time-divisionally, so as not to interfere with each other. Therefore, the display circuit may send the DP ready signal to the touch circuit to indicate the status of the display operations. The touch circuit may determine whether and when to start the touch sensing operations based on the DP ready signal. In an embodiment, the touch circuit may start the touch sensing operations only when the DP ready signal indicates that the display operations are interrupted or disabled. In an embodiment, the DP ready signal may also be referred to as a sensing start signal.

In the synchronization mode, each slave IC may generate and output a notification when obtaining the DP ready signal which indicates that this slave IC is ready for touch sensing. After the master IC obtains its DP ready signal and also receives the notification from the slave ICs, the master IC may output a confirmation signal through the master terminal. After outputting the confirmation signal, the master IC may start the touch sensing operation with a delay of the compensation time for the master IC. The confirmation signal may be forwarded to the slave ICs sequentially through the corresponding master terminals connected between the driver ICs. After receiving the confirmation signal through the master terminal, the slave IC may start the touch sensing operation with a delay of the compensation time for this slave IC. The touch sensing operation for each driver IC may be performed with a specific delay time for this driver IC, and this delay time may be the compensation time along with the offset obtained in the calibration mode as described above. With appropriate delay control, each driver IC may start the touch sensing operations at the same time, to realize the synchronization of touch sensing operations.

Figure 10:
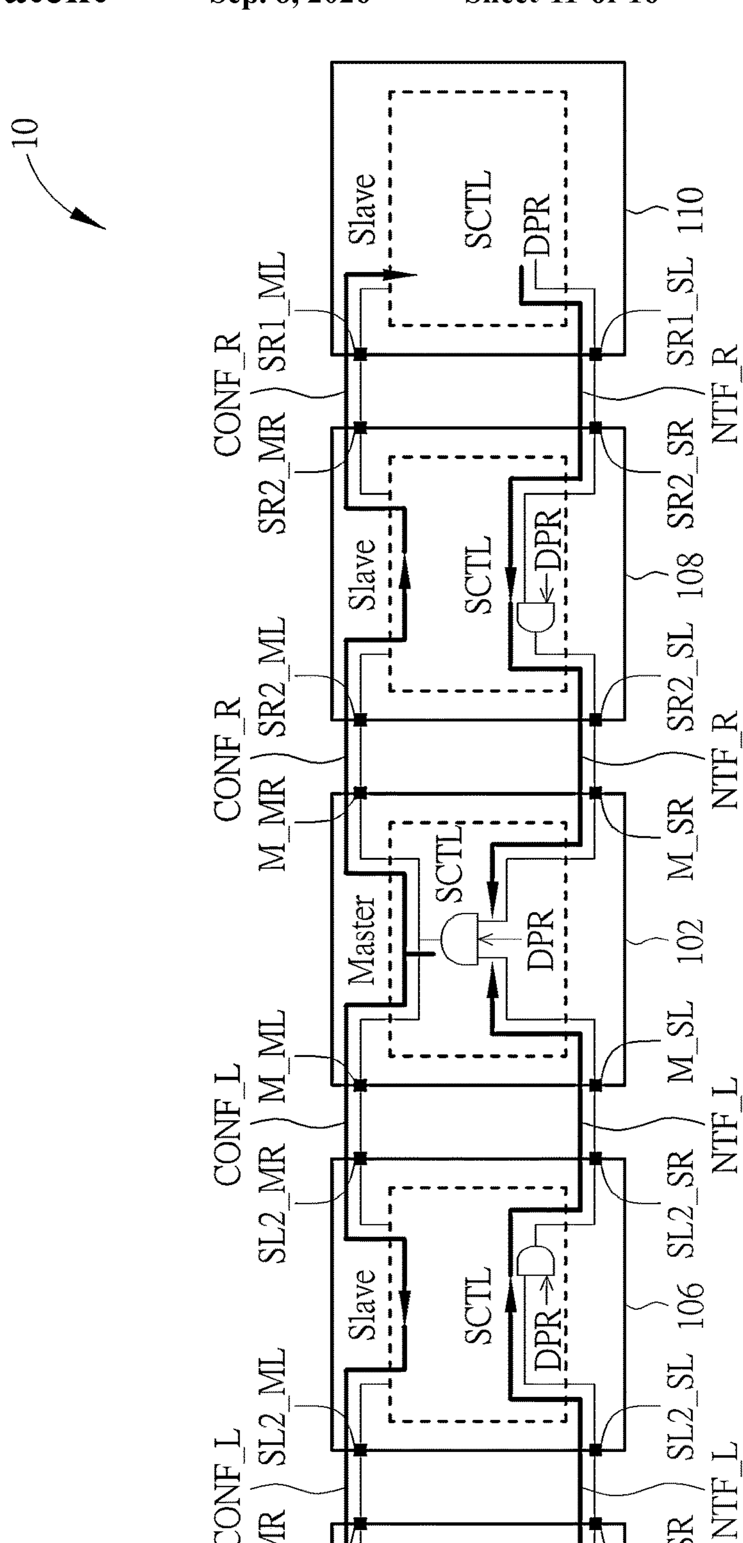
FIG. 10 illustrates an exemplary operation of the driving system in the synchronization mode.

To facilitate the illustrations, the same driving systems having identical deployments of the master IC and slave ICs are used to describe the operations of the synchronization mode. FIG. 10 illustrates an exemplary operation of the driving system 10 (having 1 master IC 102 and 4 slave ICs 104-110) in the synchronization mode.

First, when the touch panel controlled by the driving system 10 needs to perform touch sensing, each driver IC 102-110 may obtain a DP ready signal DPR, which indicates that the DP operation is interrupted and the touch sensing operation may be performed. At the left side of the master IC 102, when the left-most slave IC 104 obtains the DP ready signal DPR, it may output a notification NTF_L through the slave terminal SL1_SR. The notification NTF_L is forwarded rightwards and then received by the slave IC 106 through the slave terminal SL2_SL. The slave IC 106 may determine whether the notification NTF_L is received and also determine whether the DP ready signal DPR is obtained (i.e., received from its display circuit). When the DP ready signal DPR is obtained and the notification NTF_L from the slave IC 104 is received, the slave IC 106 may further forward the notification NTF_L to the next stage through the slave terminal SL2_SR. In other words, as for the slave IC 106, the notification NTF_L is output only when both criteria of obtaining the DP ready signal DPR and receiving the notification NTF_L are met. Subsequently, the master IC 102 may receive the notification NTF_L through the slave terminal M_SL, which indicates that the left-side driver ICs (including 104 and 106) are all ready for touch sensing.

Similarly, at the right side of the master IC 102, when the right-most slave IC 110 obtains the DP ready signal DPR, it may output a notification NTF_R through the slave terminal SR1_SL. The notification NTF_R is forwarded leftwards and then received by the slave IC 108 through the slave terminal SR2_SR. The slave IC 108 may determine whether the notification NTF_R is received and also determine whether the DP ready signal DPR is obtained (i.e., received from its display circuit). When the DP ready signal DPR is obtained and the notification NTF_R from the slave IC 110 is received, the slave IC 108 may further forward the notification NTF_R to the next stage through the slave terminal SR2_SL. In other words, as for the slave IC 108, the notification NTF_R is output only when both criteria of obtaining the DP ready signal DPR and receiving the notification NTF_R are met. Subsequently, the master IC 102 may receive the notification NTF_R through the slave terminal M_SR, which indicates that the right-side driver ICs (including 108 and 110) are all ready for touch sensing.

The master IC 102 may determine whether the notifications NTF_L and NTF_R are received through the slave terminals M_SL and M_SR, respectively, and also determine whether the DP ready signal DPR is obtained (i.e., received from its display circuit). When the DP ready signal DPR is obtained and the notifications NTF_L and NTF_R are both received, the master IC 102 may output confirmation signals CONF_L and CONF_R through the master terminals M_ML and M_MR, respectively. Note that the notification NTF_L is received from the left-side slave ICs 104 and 106 and the notification NTF_R is received from the right-side slave ICs 108 and 110; hence, as for the master IC 102, it is requested that both notifications NTF_L and NTF_R are successfully received, to ensure that all of the slave ICs 104-110 in the driving system 10 are ready for touch sensing. After outputting the confirmation signals CONF_L and CONF_R, the master IC 102 may start the touch sensing operation with a delay of the compensation time for the master IC 102, where the compensation time may be equal to the maximum path delay corresponding to the farthest slave IC.

The confirmation signal CONF_L is then sequentially received by the slave ICs 106 and 104 through the master terminals SL2_MR and SL1_MR, respectively. After receiving the confirmation signal CONF_L, each of the slave ICs 106 and 104 may start the touch sensing operation with a delay of the compensation time for the respective slave IC. Similarly, the confirmation signal CONF_R is then sequentially received by the slave ICs 108 and 110 through the master terminals SR2_ML and SR1_ML, respectively. After receiving the confirmation signal CONF_R, each of the slave ICs 108 and 110 may start the touch sensing operation with a delay of the compensation time for the respective slave IC. With appropriate compensation times, each of the driver ICs 102-110 may start the touch sensing operations at the same time, thereby performing touch sensing synchronously.

Figure 11:
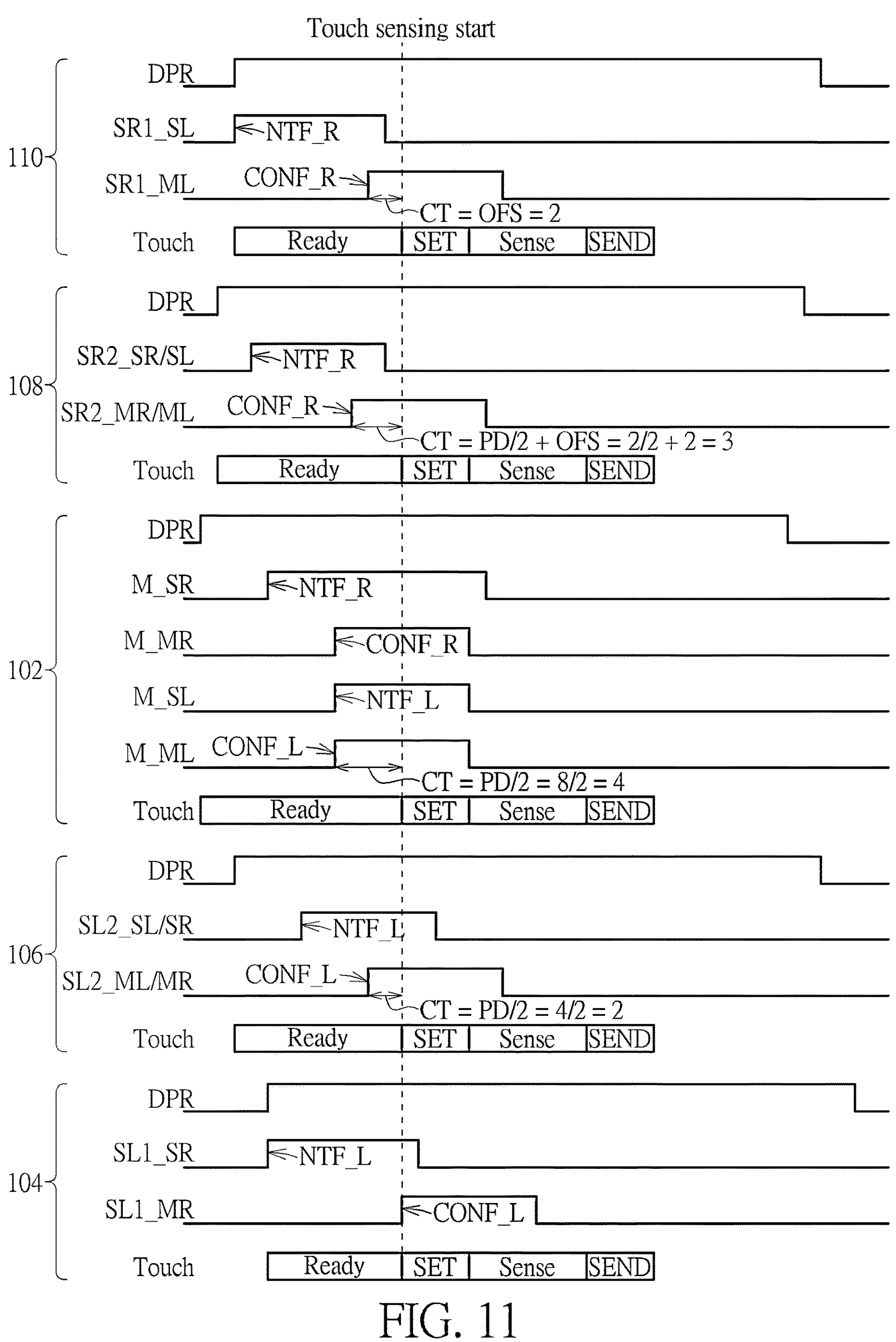
FIG. 11 is a waveform diagram of the touch sensing operations and related notifications and confirmation signals on each terminal of the driving system shown in FIG. 1.

Note that the implementation of delay times shown in FIG. 4 is also applicable to the synchronization mode for performing touch sensing. Refer to FIG. 4 along with FIG. 11, where FIG. 11 is a waveform diagram of the touch sensing operations and related notifications and confirmation signals on each terminal of the driving system 10. As shown in FIG. 11, the touch sensing operation starts with a sensing setting SET (e.g., a preset operation), and ends with a sensing end SEND (e.g., a postset operation).

In this embodiment, the slave terminals are used to forward the notifications NTF_L and NTF_R, where a low-to-high transition may represent the output of the corresponding notification. As shown in FIG. 11, the DP ready signal DPR may be a flag signal which is pulled high to indicate that the touch sensing operation is ready, and the DP ready signal DPR of each driver IC is obtained (i.e., pulled high) at respective time point.

At the right side, when obtaining the DP ready signal DPR, the right-most slave IC 110 may output the notification NTF_R to the slave IC 108 through the slave terminal SR1_SL. The notification NTF_R is sent to the slave terminal SR2_SR of the slave IC 108 with a delay time 1. At this moment, the slave IC 108 may determine that the DP ready signal DPR is obtained and the notification NTF_R is received, and thereby forwards the notification NTF_R through the slave terminal SR2_SL. The notification NTF_R is then sent to the slave terminal M_SR of the master IC 102 with a delay time 1. At the left side, when obtaining the DP ready signal DPR, the left-most slave IC 104 may output the notification NTF_L to the slave IC 106 through the slave terminal SL1_SR. The notification NTF_L is sent to the slave terminal SL2_SL of the slave IC 106 with a delay time 2. At this moment, the slave IC 106 may determine that the DP ready signal DPR is obtained and the notification NTF_L is received, and thereby forwards the notification NTF_L through the slave terminal SL2_SR. The notification NTF_L is then sent to the slave terminal M_SL of the master IC 102 with a delay time 2.

Subsequently, the master IC 102 may determine that both of the notifications NTF_L and NTF_R are received, and the DP ready signal DPR has indicated that the touch sensing operation is ready. At this moment, the master IC 102 may output a confirmation signal CONF_L to the left side through the master terminal M_ML, and also output a confirmation signal CONF_R to the right side through the master terminal M_MR at the same time. In this embodiment, each confirmation signal CONF_L or CONF_R is represented by a pulse (or the rising edge of a pulse), but a skilled person would know that the confirmation signal may be realized in any possible manner. When outputting the confirmation signals CONF_L and CONF_R, the master 102 may start the touch sensing operation (e.g. starts the sensing setting SET) after delaying by a compensation time, which may be calculated from the maximum path delay associated with the master IC 102 obtained in the calibration mode.

In this embodiment, based on the left-side calibration operation, the master IC 102 (and/or the slave ICs 104 and 106) may obtain that the path delay between 102 and 104 equals 8 and the path delay between 104 and 106 equals 4. After the right-side calibration operation, the master IC 102 (and/or the slave ICs 108 and 110) may obtain that the path delay between 102 and 110 equals 4 and the path delay between 110 and 108 equals 2. The maximum path delay (denoted by PD) associated with the master IC 102 is 8; hence, the compensation time (denoted by CT) for the master IC 102 is calculated as 8/2=4, as shown in FIG. 11.

In addition, since the path delays for the left-side slave ICs 104 and 106 are greater than the path delays for the right-side slave ICs 108 and 110, an offset (denoted by OFS) is added to the compensation time for the right-side slave ICs 108 and 110 having smaller path delays, to compensate for the path delay difference. In this embodiment, the offset is equal to the difference of the path delay between 102 and 104 and the path delay between 102 and 110 divided by 2, i.e., (8−4)/2=2.

At the left side, the confirmation signal CONF_L may be sequentially received by the slave ICs 106 and 104. When the slave IC 106 receives the confirmation signal CONF_L through the master terminal SL2_MR, it may delay by a compensation time and then start the touch sensing operation, and the compensation time for the slave IC 106 is equal to the path delay divided by 2, i.e., 4/2=2. Subsequently, when the slave IC 104 receives the confirmation signal CONF_L through the master terminal SL1_MR, it may immediately start the touch sensing operation without any delay, since the slave IC 104 has the maximum path delay corresponding to the master IC 102 and is the last driver IC receiving the confirmation signal.

At the right side, the confirmation signal CONF_R may be sequentially received by the slave ICs 108 and 110. When the slave IC 108 receives the confirmation signal CONF_R through the master terminal SR2_ML, it may delay by a compensation time with an offset and then start the touch sensing operation. The actual compensation time for the slave IC 108 is 3, which is equal to the path delay divided by 2 plus the offset. Subsequently, when the slave IC 110 receives the confirmation signal CONF_R through the master terminal SR1_ML, it may delay by a compensation time which is equal to the offset, i.e., 2, associated with the left-side and right-side delay difference, and then start the touch sensing operation.

As shown in FIG. 11, with appropriate delay control, the master IC 102 and the slave ICs 104-110 may start the sensing setting SET at the same time, so as to perform the touch sensing operation synchronously.

Figure 12:
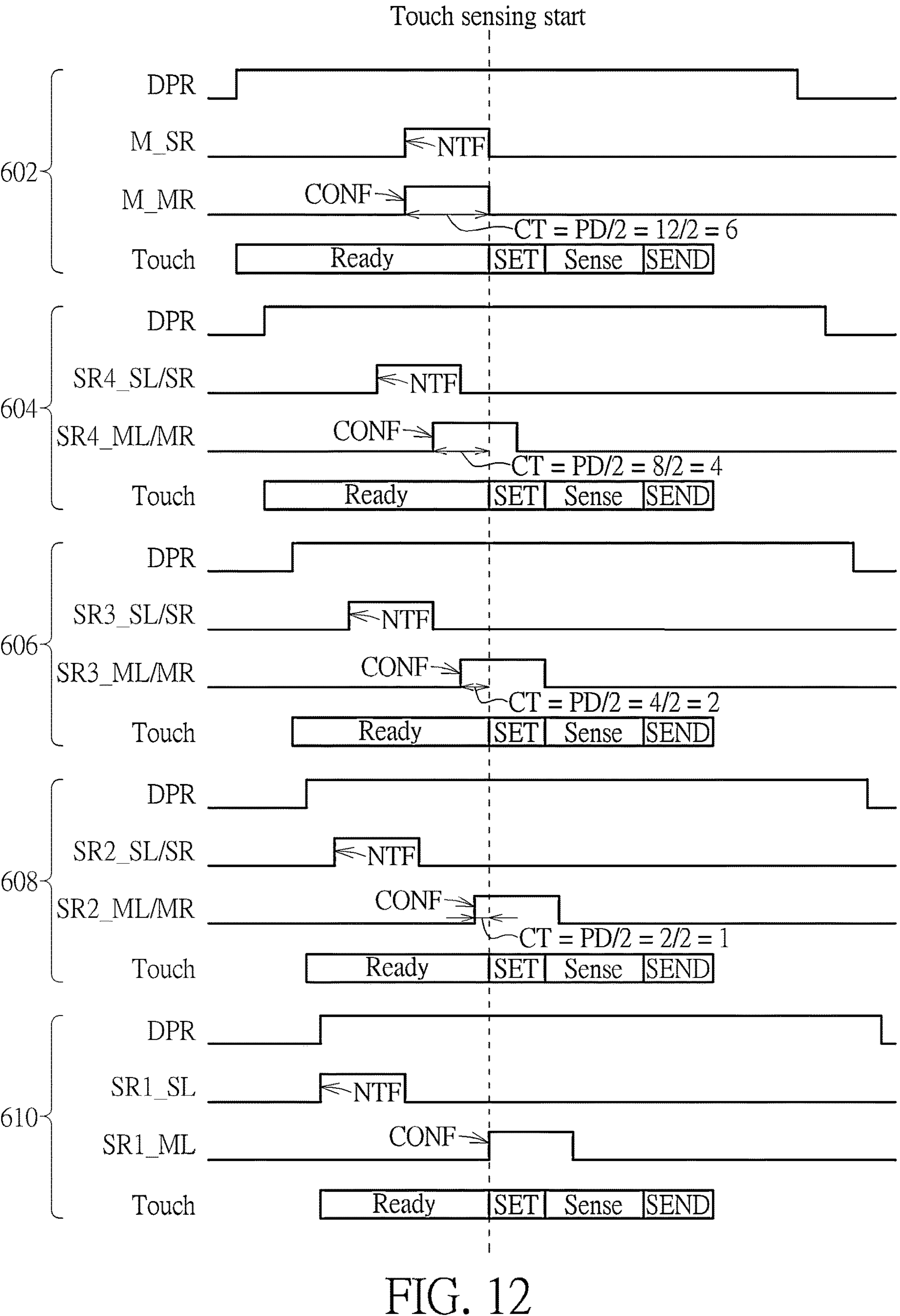
FIG. 12 is a waveform diagram of the touch sensing operations and related notifications and confirmation signals on each terminal of the driving system shown in FIG. 6.

In another embodiment, the implementation of master IC and slave ICs and the related delay times shown in FIG. 6 are also applicable to the synchronization mode for performing touch sensing. Refer to FIG. 12 along with FIG. 6, where FIG. 12 is a waveform diagram of the touch sensing operations and related notifications and confirmation signals on each terminal of the driving system 60. Similarly, as shown in FIG. 12, the touch sensing operation starts with a sensing setting SET and ends with a sensing end SEND.

Similarly, the slave terminals are used to forward the notification NTF, and the master terminals are used to forward the confirmation signal CONF. In this embodiment, since the master IC 602 is the left-most driver IC, only one notification NTF and only one confirmation signal CONF are needed to realize the synchronization operation for the slave ICs 604-610, which are all connected at the right side of the master IC 602.

In detail, the transmissions of the notification NTF may start at the right-most slave IC 610, which outputs the notification NTF through the slave terminal SR1_SL when obtaining the DP ready signal DPR. The notification NTF is then forwarded leftwards to the driver ICs 608, 606, 604 and 602 sequentially with respective delay times. As for the slave IC 608, 606 or 604, it will forward the notification NTF to the next stage when the DP ready signal DPR is obtained and the notification NTF is received from the previous stage, i.e., the two criteria are both met.

When the master IC 602 receives the notification NTF through the slave terminal M_SR and also obtains the DP ready signal DPR which indicates that the touch sensing operation is ready, the master IC 602 may output the confirmation signal CONF through the master terminal M_MR, and start the touch sensing operation with a delay of a compensation time for the master IC 602. The confirmation signal CONF is forwarded rightwards to the driver ICs 604, 606, 608 and 610 sequentially with respective delay times. As for the slave ICs 604-610, after receiving the confirmation signal CONF, it will start the touch sensing operation with a delay of a compensation time for the respective slave IC. The compensation times may be calculated through the above calibration operations.

In this embodiment, after the calibration operations, the master IC 602 may obtain that the path delay between 602 and 610 equals 12, the path delay between 604 and 610 equals 8, the path delay between 606 and 610 equals 4, and the path delay between 608 and 610 equals 2. The maximum path delay associated with the master IC 602 is 12; hence, the compensation time for the master IC 602 is calculated as 12/2=6, as shown in FIG. 12. The confirmation signal CONF output by the master IC 602 may be sequentially received by the slave ICs 604-610. When the slave IC 604 receives the confirmation signal CONF, it may delay by a compensation time and then start the touch sensing operation, and the compensation time for the slave IC 604 is equal to the path delay divided by 2, i.e., 8/2=4. When the slave IC 606 receives the confirmation signal CONF, it may delay by a compensation time and then start the touch sensing operation, and the compensation time for the slave IC 606 is equal to the path delay divided by 2, i.e., 4/2=2. When the slave IC 608 receives the confirmation signal CONF, it may delay by a compensation time and then start the touch sensing operation, and the compensation time for the slave IC 608 is equal to the path delay divided by 2, i.e., 2/2=1. When the slave IC 610 receives the confirmation signal CONF, it may immediately start the touch sensing operation without any delay because the slave IC 610 has the maximum path delay corresponding to the master IC 602 and is the last driver IC receiving the confirmation signal CONF. Note that only a one-side calibration is performed in this embodiment; hence, no offset is required in the calculation of the compensation time.

As shown in FIG. 12, with appropriate delay control, the master IC 602 and the slave ICs 604-610 may start the sensing setting SET at the same time, so as to perform the touch sensing operation synchronously.

In the above embodiments, the slave ICs send the notifications through the corresponding slave terminals, but the implementation of notifications is not limited thereto. In another embodiment, the slave ICs may send the notifications through the command line coupled between the master IC and the slave ICs.

Figure 13:
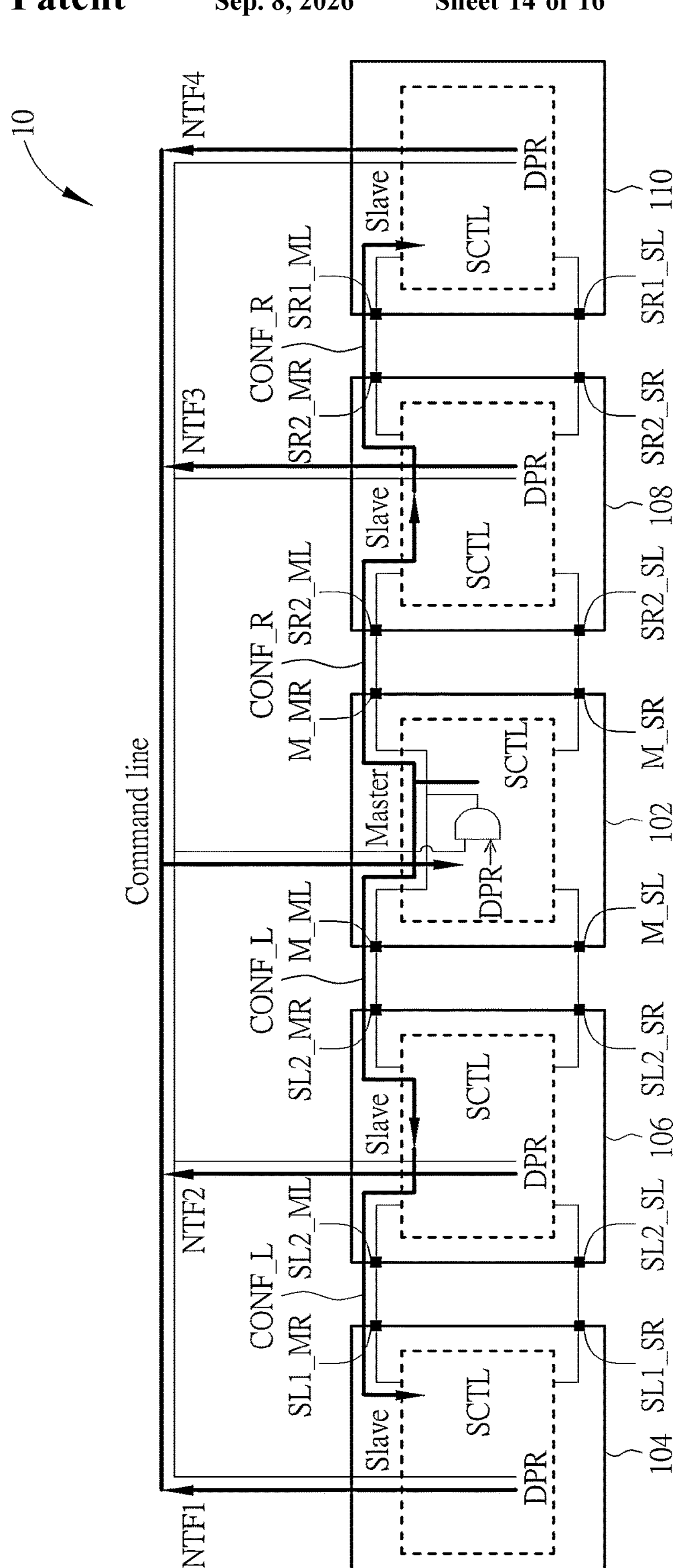
FIG. 13 illustrates another exemplary operation of the driving system in the synchronization mode.

FIG. 13 illustrates another exemplary operation of the driving system 10 in the synchronization mode. In this embodiment, the slave ICs 104-110 send respective notifications NTF1-NTF4 to the master IC 102 through the command line. For example, the master IC 102 may read the status of each slave IC 104-110 through the command line, to determine whether each slave IC 104-110 is ready for touch sensing. Alternatively, the slave IC 104-110 may send a signal carrying the corresponding notification NTF1-NTF4 to the master IC 102 through the command line. After receiving the notifications NTF1-NTF4, the master IC 102 may deliver the confirmation signals CONF_L and CONF_R through the master terminals M_ML and M_MR, respectively. The detailed operations of the confirmation signals CONF_L and CONF_R are similar to those described above, and will not be repeated herein.

In the above embodiments, the display circuit of a driver IC may send a DP ready signal to the touch circuit of the driver IC, to indicate whether the touch sensing operation is performable. In another embodiment, the touch circuit may not receive the DP ready signal from the display circuit. For example, the display circuit may not be able to output the DP ready signal when it is in the sleep mode where the display function is off. In such a situation, the confirmation signal provided by the master IC may replace the function of the DP ready signal, allowing the driver IC to be aware that other driver ICs are ready for touch sensing.

Figure 14:
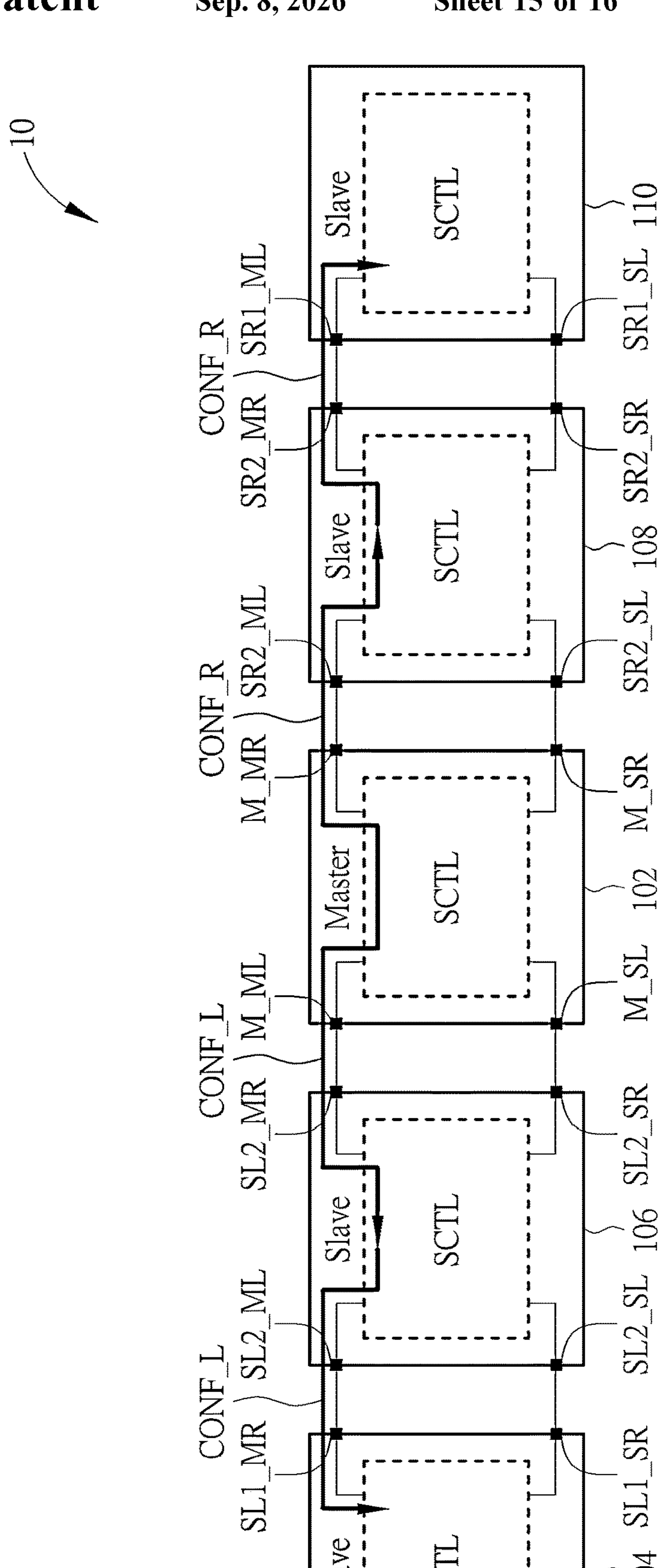
FIG. 14 illustrates a further exemplary operation of the driving system in the synchronization mode where the DP ready signal is omitted.
Figure 15:
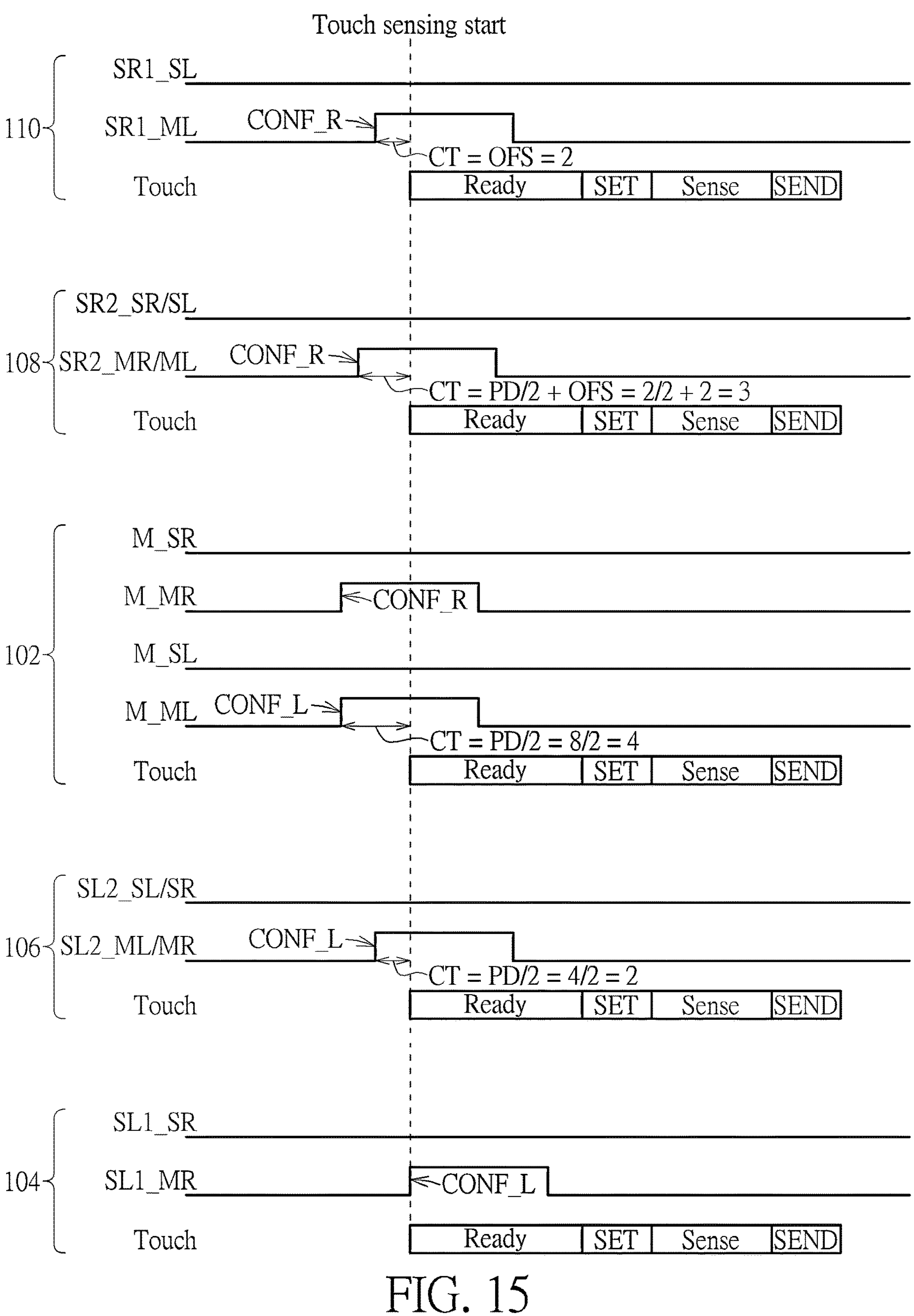
FIG. 15 is a waveform diagram of the touch sensing operations and related notifications and confirmation signals on each terminal of the driving system where the DP ready signal is omitted.

FIG. 14 illustrates a further exemplary operation of the driving system 10 in the synchronization mode, where the DP ready signal DPR is omitted. The related waveforms are shown in FIG. 15, which illustrates the touch sensing operations and the related notifications NTF_L and NTF_R and confirmation signals CONF_L and CONF_R on each terminal of the driving system 10.

In this embodiment, there is no DP ready signal used to indicate whether each driver IC is ready for touch sensing; hence, the master IC 102 would not need to know whether each slave IC 104-110 is ready for touch sensing. In such a situation, each slave IC 104-110 may not send/forward the notification. The master IC 102 may output the confirmation signals CONF_L and CONF_R when the touch panel commonly controlled by the driver ICs 102-110 needs to perform touch sensing. Note that the display circuit may be off or disabled, and thus the master IC 102 may start to send the confirmation signals CONF_L and CONF_R without considering the interferences of display operations. Since the function of the DP ready signal is replaced by the confirmation signals CONF_L and CONF_R, the master IC 102 may enter the sensing ready state with a corresponding delay time (i.e., compensation time) after outputting the confirmation signals CONF_L and CONF_R, and each slave IC 104-110 may enter the sensing ready state with a corresponding delay time (i.e., compensation time) after receiving the corresponding confirmation signal CONF_L or CONF_R, as shown in FIG. 15.

Therefore, with appropriate delay control, the master IC 102 and the slave ICs 104-110 may enter the sensing ready state at the same time, and thus they will start the sensing setting SET at the same time, so as to perform t touch sensing operation synchronously.

In the present invention, the driver ICs in the driving system are connected in series, and every two adjacent driver ICs are connected through two terminals. In such a situation, the driver IC may at most have 4 terminals used for the calibration and synchronization operations (except for the terminal coupled to the command line). More specifically, the left-most driver IC and the right-most driver IC may be configured with 2 terminals connected to its adjacent driver IC, and other driver ICs may be configured with 4 terminals connected to the adjacent driver ICs at the left and right sides, respectively. This connection scheme will decrease the layout complexity and reduce the usage of cross wires.

In addition, different from the structure in U.S. application Ser. No. 18/225,156 where the terminals are connected through a transmission bus, in the structure of the driving system in the embodiments of the present invention, each terminal is only connected to one corresponding terminal of the adjacent driver IC. Therefore, the calibration and synchronization operations may be well designed to allow the I/O status of each terminal to be fixed, so as to avoid the leakage current caused by status transition. For example, in various embodiments, a master terminal may be always used to deliver signals away from the master IC, and a slave terminal may be always used to deliver signals toward the master IC. In such a situation, as for each terminal, it will always be an output terminal or always be an input terminal.

Furthermore, the connection scheme that the driver ICs are connected in series may support any number of driver ICs without an upper limitation, where the master IC may be deployed at any position. In a preferable embodiment, the driving system may include more than 3 driver ICs connected in series.

In various embodiments, the synchronization mode may be operated when the touch panel commonly controlled by the driver ICs needs to perform touch sensing. The calibration mode may be performed at any time before the touch sensing operations. In order to be adapted to the environmental variations, the calibration mode may be performed periodically to ensure accurate path delay values under the present environmental parameters.

Note that the present invention aims at providing a method of synchronizing the touch sensing operations performed in a driving system having multiple driver circuits. Those skilled in the art may make modifications and alterations accordingly. For example, in the above embodiments, the numeral values of path delay and compensation time are only examples used for illustrations. In another embodiment, the calculated compensation time may have different results under different delay times between the driver ICs. In addition, in various embodiments of the present invention, the driving system may include any number of driver ICs, among which the master IC and slave ICs may be allocated symmetrically or non-symmetrically, and the calibration mode and the synchronization mode are operable in various driving systems. For example, the driving system 80 shown in FIG. 8 includes only 4 driver ICs and thus the master IC is connected to different numbers of slave ICs at the left side and the right side. This structure may also perform the synchronization mode by transmitting the notifications and confirmation signals in a similar manner, where the timing difference caused by the non-symmetric implementation may also be compensated through an offset. The related operations could be easily inferred by a skill person and will not be narrated herein.

To sum up, the present invention provides a method of synchronizing the touch sensing operations performed in a driving system having multiple driver circuits for cooperatively controlling a touch panel. The driver circuits are connected in series with two wires connected between every two adjacent driver circuits. One of the driver circuits is configured as a master IC and other driver circuits are configured as slave ICs. The provided method includes a calibration mode and a synchronization mode. In the calibration mode, the path delay between the driver circuits may be measured, in order to calculate a compensation time for each driver circuit. The compensation time obtained in the calibration mode may then be applied in the synchronization mode, to perform synchronization of touch sensing. Through appropriate delay control with the accurate compensation time, each driver circuit may start the touch sensing operation at the same time, thereby performing touch sensing synchronously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving system comprising:

a plurality of driver circuits connected in series, wherein each of the plurality of driver circuits is connected to one or two adjacent driver circuits through a master terminal and a slave terminal, the plurality of driver circuits comprising:

a first driver circuit to output a first synchronization signal through the master terminal; and a second driver circuit to output a second synchronization signal through the slave terminal when receiving the first synchronization signal through the master terminal;

wherein a compensation time corresponding to the second driver circuit is calculated according to an output time point of the first synchronization signal and a reception time point of the second synchronization signal.

2. The driving system of claim 1, wherein the plurality of driver circuits comprise more than 3 driver circuits.

3. The driving system of claim 1, wherein a third driver circuit among the plurality of driver circuits is coupled between the first driver circuit and the second driver circuit, to receive the first synchronization signal from the first driver circuit through the master terminal and receive the second synchronization signal from the second driver circuit through the slave terminal.

4. The driving system of claim 3, wherein a compensation time corresponding to the third driver circuit is calculated according to a reception time point of the first synchronization signal received by the third driver circuit and a reception time point of the second synchronization signal received by the third driver circuit.

5. The driving system of claim 1, wherein the first driver circuit is a master driver circuit, which obtains a plurality of compensation times by outputting the first synchronization signal, wherein each of the plurality of compensation times corresponds to one of the plurality of driver circuits.

6. The driving system of claim 1, wherein the first driver circuit is a slave driver circuit, which sends the compensation time corresponding to the second driver circuit to a master driver circuit among the plurality of driver circuits.

7. The driving system of claim 1, wherein the first driver circuit is a master driver circuit, and the plurality of driver circuits comprise at least one first slave driver circuit coupled to the master driver circuit through a first master terminal and a first slave terminal and at least one second slave driver circuit coupled to the master driver circuit through a second master terminal and a second slave terminal, wherein the master driver circuit outputs the first synchronization signal to the at least one first slave driver circuit through the first master terminal and outputs a third synchronization signal to the at least one second slave driver circuit through the second master terminal.

8. The driving system of claim 7, wherein the first driver circuit outputs the first synchronization signal and the third synchronization signal simultaneously.

9. The driving system of claim 1, wherein the plurality of driver circuits synchronize a sensing time for touch sensing by using a plurality of compensation times.

* * * * *